United States Patent
Shah et al.

(10) Patent No.: US 10,686,739 B2
(45) Date of Patent: Jun. 16, 2020

(54) SYSTEMS AND METHODS FOR ENABLING CLIENT-SIDE RENDERING OF RICH CONTENT BY A PLURALITY OF BROWSER-BASED MESSAGING INTERFACES COMMUNICATING WITH A SERVER VIA A SINGLE COMMUNICATION SESSION

(71) Applicant: salesforce.com, inc., San Francisco, CA (US)

(72) Inventors: Anal Shah, Fremont, CA (US); Justin MacMillin, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 69 days.

(21) Appl. No.: 16/164,649

(22) Filed: Oct. 18, 2018

(65) Prior Publication Data
US 2020/0127951 A1    Apr. 23, 2020

(51) Int. Cl.
  *H04L 12/58*   (2006.01)
  *H04L 29/08*   (2006.01)
  (Continued)

(52) U.S. Cl.
  CPC .......... *H04L 51/046* (2013.01); *G06F 16/986* (2019.01); *H04L 12/1813* (2013.01);
  (Continued)

(58) Field of Classification Search
  CPC . H04L 51/046; H04L 12/1813; H04L 51/063; H04L 51/08; H04L 67/145; G06F 16/986
  See application file for complete search history.

(56) References Cited

U.S. PATENT DOCUMENTS 5,577,188 A   11/1996   Zhu
5,608,872 A    3/1997   Schwartz et al.
(Continued)

OTHER PUBLICATIONS

United States Patent and Trademark Office, Notice of Allowance and Fee(s) Due in U.S. Appl. No. 16/140,705, dated Jan. 23, 2020.

*Primary Examiner* — Mohamed A. Wasel
(74) *Attorney, Agent, or Firm* — LKGlobal | Lorenz & Kopf, LLP

(57) ABSTRACT

A method for browser-based chat messaging is provided. The method presents browser-based presentation interfaces, including a master and at least one slave, and including a chat messaging interface for the master; establishes a single communication session with a server system, by the master; receives chat data, by the chat messaging interface of the master via the single communication session, including rich content comprising graphical elements, enhanced formatting, and interactive functionality; stores the chat data including the rich content in session storage for the master; renders the chat data including the rich content, by the chat messaging interface of the master; provides updated chat data including the rich content to the slaves, by the master via a broadcast pipeline for the browser application; and presents the updated chat data by re-rendering the chat data including the rich content, via secondary chat messaging interfaces corresponding to the slaves.

20 Claims, 14 Drawing Sheets

(51) Int. Cl.
*H04L 12/18* (2006.01)
*G06F 16/958* (2019.01)
(52) U.S. Cl.
CPC ............ *H04L 51/063* (2013.01); *H04L 51/08* (2013.01); *H04L 67/145* (2013.01)

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,730,478 B2 | 6/2010 | Weissman | |
| 7,779,475 B2 | 8/2010 | Jakobson et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,989,120 B2 * | 3/2015 | McNamara | H04L 65/4023 370/329 |
| 9,489,356 B2 | 11/2016 | Sheretov et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0078431 A1 * | 4/2004 | Ahn | H04L 12/1822 709/205 |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2007/0240054 A1 | 10/2007 | Todoroki et al. | |
| 2008/0249972 A1 | 10/2008 | Dillon | |
| 2009/0063414 A1 | 3/2009 | White et al. | |
| 2009/0100342 A1 | 4/2009 | Jakobson | |
| 2009/0177744 A1 | 7/2009 | Marlow et al. | |
| 2011/0247051 A1 | 10/2011 | Bulumulla et al. | |

(56) References Cited

U.S. PATENT DOCUMENTS

| | | |
|---|---|---|
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2018/0367477 A1* | 12/2018 | Hariram .............. H04L 51/14 |
| 2019/0020673 A1 | 1/2019 | Weinstein et al. |

* cited by examiner

ENABLING THE AT LEAST ONE SLAVE PRESENTATION INTERFACE TO INDIRECTLY COMMUNICATE WITH THE SERVER SYSTEM USING THE SINGLE COMMUNICATION SESSION MAINTAINED BY THE MASTER PRESENTATION INTERFACE
(FIG. 6, 602) ~900

RECEIVE SLAVE-ORIGINATED COMMUNICATIONS FROM THE AT LEAST ONE SLAVE PRESENTATION INTERFACE AND DIRECTED TO THE SERVER SYSTEM, BY THE MASTER PRESENTATION INTERFACE VIA THE BROADCAST PIPELINE OF THE BROWSER APPLICATION, WHEREIN THE SLAVE-ORIGINATED COMMUNICATIONS COMPRISE AT LEAST USER INPUT CHAT MESSAGING DATA ~902

STORE THE USER INPUT CHAT MESSAGING DATA IN THE SESSION STORAGE FOR THE MASTER PRESENTATION INTERFACE, BY THE MASTER PRESENTATION INTERFACE, WHEREIN THE USER INPUT CHAT MESSAGING DATA COMPRISES TEXT-BASED MESSAGES (STRING FORMAT) AND RICH CONTENT MESSAGES (JSON OBJECT FORMAT) ~904

USE THE SINGLE COMMUNICATION SESSION WITH THE SERVER SYSTEM TO TRANSMIT THE STRING-FORMATTED CHAT MESSAGING DATA AND THE JSON OBJECT CHAT MESSAGING DATA TO THE SERVER SYSTEM, BY THE MASTER PRESENTATION INTERFACE ~906

FIG. 9

SYSTEMS AND METHODS FOR ENABLING CLIENT-SIDE RENDERING OF RICH CONTENT BY A PLURALITY OF BROWSER-BASED MESSAGING INTERFACES COMMUNICATING WITH A SERVER VIA A SINGLE COMMUNICATION SESSION

TECHNICAL FIELD

Embodiments of the subject matter described herein relate generally to client-server communications techniques established on the client side for messaging applications. More particularly, embodiments of the subject matter relate to a browser-based, client-side mechanism for enabling more than one browser-based messaging interface to communicate with a server using a single communication session, and to locally store, extract, and render rich content within the browser-based messaging application.

BACKGROUND

During a web-browsing session, a user may navigate various websites using more than one browser application window and/or browser application tab. Users may wish to open certain webpages or sections of webpages and to keep them open, while continuing to browse other websites or sections using other open tabs or windows. In circumstances wherein a user has opened and is currently using a plurality of windows or tabs, servers communicating with the user's browser application are generally required to maintain a separate communication session for each open tab or window, thus requiring multi-threaded communications between the server and the client device. A server may not have the resources to maintain these multi-threaded communication sessions.

Browser windows and browser tabs used to navigate webpages may also provide messaging functionality for a user to participate in online communications with live agents or automated messaging applications (e.g., "chat-bots") associated with a business or company associated with a navigated webpage. Such messaging functionality may include capabilities to exchange text-based messages and/or rich content messages during a web-browsing session. However, a browser application configured to simultaneously permit the use of more than one browser window or browser tab may not have the functionality to render the rich content messages in the intended original format using more than one browser window or tab.

Accordingly, it is desirable to provide client-server communications solutions that are less resource-intensive on the server-side. In addition, it is desirable to provide solutions to render rich content using more than one potentially user-activated browser window or tab. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for communicating during a chat messaging session, by a client device comprising a computer system configured to store, maintain, execute, and support a browser application that includes chat messaging functionality. The method presents a plurality of browser-based presentation interfaces comprising at least one of browser-based tabs and browser-based windows, by the client device, wherein the plurality of browser-based presentation interfaces are associated with the browser application, and wherein the plurality of browser-based presentation interfaces include a master presentation interface and at least one slave presentation interface; presents a chat messaging interface for the chat messaging session, by the client device via the master presentation interface, wherein the chat messaging interface is configured to display the chat messaging session including chat messaging data; establishes a single communication session with a server system providing the chat messaging session to the browser application, by the client device via the master presentation interface; receives a subset of the chat messaging data, by the chat messaging interface of the master presentation interface via the single communication session, wherein the subset includes rich content comprising at least one of graphical elements, enhanced formatting, and interactive functionality; stores the subset of the chat messaging data including the rich content in session storage for the master presentation interface of the browser application, by the client device; renders the subset of the chat messaging data including the rich content, via the chat messaging interface of the master presentation interface; provides updated chat messaging session data to the at least one slave presentation interface, by the master presentation interface via a broadcast pipeline for the browser application, wherein the updated chat messaging session data comprises the subset including the rich content; and presents the updated chat messaging session data by re-rendering the subset including the rich content, via at least one secondary chat messaging interface corresponding to the at least one slave presentation interface.

Some embodiments of the present disclosure provide a client device configured to communicate with a server system during a chat messaging session, the client device configured to store, maintain, execute, and support a browser application that includes chat messaging functionality. The client device includes: a system memory element; a communication device, configured to establish communication connections to a server system and to transmit and receive data via the communication connections; a display device, configured to present a plurality of browser-based presentation interfaces comprising at least one of browser-based tabs and browser-based windows, wherein the plurality of browser-based presentation interfaces are associated with the browser application, and wherein the plurality of browser-based presentation interfaces include a master presentation interface and at least one slave presentation interface; and at least one processor communicatively coupled to the system memory element, the communication device, and the display device, the at least one processor configured to: present a chat messaging interface for the chat messaging session, via the master presentation interface, wherein the chat messaging interface is configured to display the chat messaging session including chat messaging data; initiate establishing a single communication session with a server system providing the chat messaging session to the browser application, by the communication device via the master presentation interface; receive a subset of the chat messaging data, by the chat messaging interface of the master presentation interface via the single communication session, wherein the subset includes rich content comprising at least one of graphical elements, enhanced formatting, and interactive functionality; store the subset of the chat messaging data including the rich content in session storage for the master presentation interface of the browser application;

initiate rendering the subset of the chat messaging data including the rich content, by the display device via the chat messaging interface of the master presentation interface; provide updated chat messaging session data to the at least one slave presentation interface, by the master presentation interface via a broadcast pipeline for the browser application, wherein the updated chat messaging session data comprises the subset including the rich content; and initiate presenting the updated chat messaging session data by re-rendering the subset including the rich content, by the display device via at least one secondary chat messaging interface corresponding to the at least one slave presentation interface.

Some embodiments of the present disclosure provide a non-transitory, computer-readable medium containing instructions thereon, which, when executed by a processor, are capable of performing a method for communicating during a chat messaging session, by a client device comprising a computer system configured to store, maintain, execute, and support a browser application that includes chat messaging functionality. The method presents a plurality of browser-based presentation interfaces comprising at least one of browser-based tabs and browser-based windows, by the client device, wherein the plurality of browser-based presentation interfaces are associated with the browser application, and wherein the plurality of browser-based presentation interfaces include a master presentation interface and at least one slave presentation interface; presents a chat messaging interface for the chat messaging session, by the client device via the master presentation interface, wherein the chat messaging interface is configured to display the chat messaging session including chat messaging data; establishes a single communication session with a server system providing the chat messaging session to the browser application, by the client device via the master presentation interface; uses the master presentation interface as a communications intermediary for the plurality of browser-based presentation interfaces of the browser application, by enabling the at least one slave presentation interface to indirectly communicate with the server system using the single communication session maintained by the master presentation interface, by: receiving a subset of the chat messaging data, by the chat messaging interface of the master presentation interface via the single communication session, wherein the subset includes rich content comprising at least one of graphical elements, enhanced formatting, and interactive functionality; storing the subset of the chat messaging data including the rich content in session storage for the master presentation interface of the browser application, by the client device; rendering the subset of the chat messaging data including the rich content, via the chat messaging interface of the master presentation interface; providing updated chat messaging session data to the at least one slave presentation interface, by the master presentation interface via a broadcast pipeline for the browser application, wherein the updated chat messaging session data comprises the subset including the rich content; and presenting the updated chat messaging session data by re-rendering the subset including the rich content, via at least one secondary chat messaging interface corresponding to the at least one slave presentation interface.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 9 is a flow chart that illustrates a second embodiment of a process for enabling the at least one slave presentation interface to indirectly communicate with the server system using the single communication session maintained by the master presentation interface, in accordance with the disclosed embodiments;

DETAILED DESCRIPTION

Figure 1:
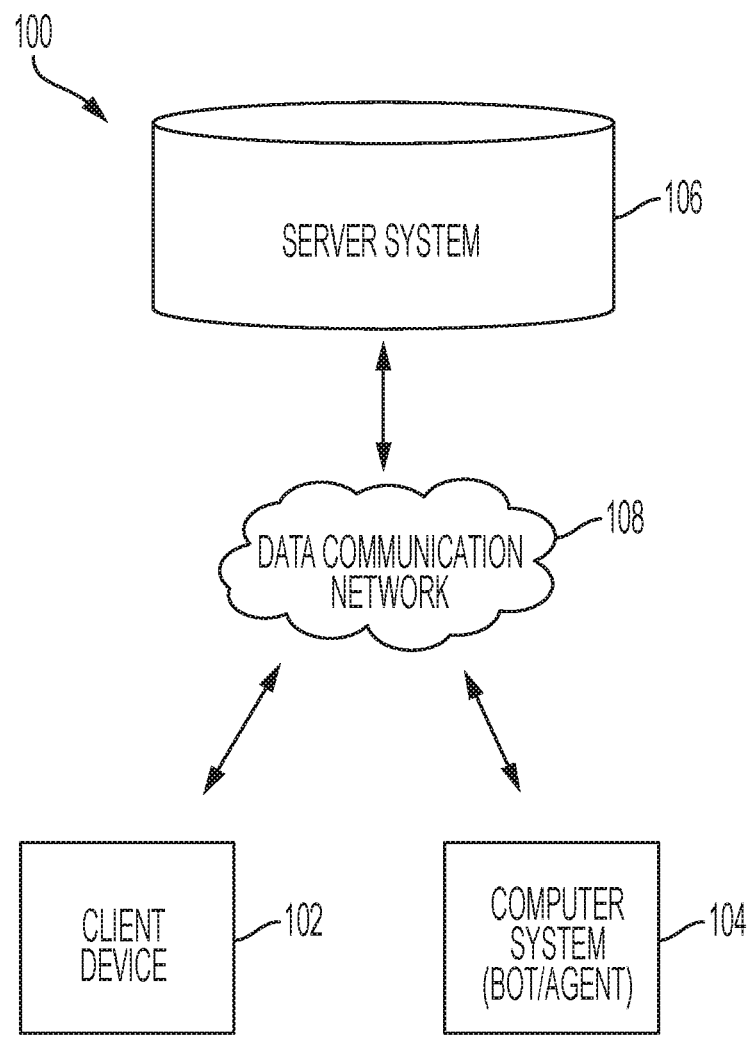
FIG. 1 is a diagram of a system for providing client-side, browser-based, communication session continuity for rendering rich content via a messaging application for a plurality of browser-based presentation interfaces, in accordance with the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for establishing a client-side, browser-based solution for communicating with one or more servers by a plurality of presentation interfaces, and corresponding chat messaging interfaces, provided by a client device. More specifically, the subject matter relates to establishing a master/slave model for the plurality of presentation interfaces, such that one particular "master" tab or window for the browser application establishes a communication session for exchanging data messages with the one or more servers and acts as an intermediary to facilitate the exchange of data transmissions between the one or more servers and at least one "slave" tab or window for the browser application. Further, the present disclosure provides systems and methods for ensuring continuity of rich content for chat messaging data displayed by a chat messaging interface presented by one of the above-described presentation interfaces. Specifically, providing rich content chat messages for newly-opened secondary browser windows or browser tabs (i.e., slave presentation interfaces) by locally storing and extracting rich content chat messages in a format compatible with preserving and retaining rich content characteristics of the chat messaging data, instead of converting locally stored chat messages into a plain-text format as is common in the art.

Certain terminologies are used with regard to the various embodiments of the present disclosure. A presentation interface is a graphical user interface (GUI) associated with the browser application, the GUI configured to present a document or panel including website data, text-based elements, graphical elements, user-selectable elements (e.g., menus, hyperlinks), and any other web-based, visually-presented graphic or text element configured to convey website data and/or to receive user input data. A chat messaging interface is a graphical element provided by a presentation interface that enables a user to communicate with another chat participant. Typically, a chat messaging interface is implemented as a widget or window-inside-browser-window that is smaller than the browser tab or browser window (i.e., browser presentation interface GUI). The chat messaging interface is configured to present (1) user-entered communications, and (2) communications received by the client device and directed to the user from other chat participants. The chat messaging interface is further configured to present communications from the user of the client device and other chat participants (e.g., an agent, a chat-bot) using text or rich content.

Rich content may include graphical elements, enhanced formatting, interactive functionality, and the like. Graphical elements include pictures, symbols, icons, and any other visual representation displayed as part of a presentation interface (i.e., browser window, browser tab). Enhanced formatting refers to visually augmented text representations that include color, styling (e.g., bold text, italic text), text sizing, and other HyperText Markup Language (HTML) features (e.g., hyperlinks). Text representations with enhanced formatting may also be referred to as formatted text, styled text, or rich text. Interactive functionality refers to graphical elements configured to receive user input, such as a graphical button for virtual "push" via user click/selection, a radio button filled in by user selection, a checkbox that is "checked" by user selection, a picture or icon that is highlighted, framed, or otherwise indicated as selected by user click/selection, a graphical dial or slider configured for user adjustment, or the like. Interactive functionality of rich content includes any visual representation configured for user interaction and displayed via a chat messaging interface.

A communication session is a data transfer thread between the server system and a particular aspect of the client device which receives server-based data via the communication session. A master browser window or master browser tab (presented as part of the executed browser application) is an aspect of the client device capable of initiating and maintaining the one communication session between the browser application and one or more servers, wherein the one communication session is used by each of the presentation interfaces of the browser application to communicate with the server system. Slave windows or tabs communicate with the one or more servers by broadcasting data to be received by the master presentation interface, and the master presentation interface is configured to transmit the received data to the one or more servers.

Turning now to the figures, FIG. 1 is a diagram of a system 100 for providing client-side, browser-based, communication session continuity for rendering rich content via a messaging application for a plurality of browser-based presentation interfaces, in accordance with the disclosed embodiments. As shown, the system 100 includes a client device 102 for operation by a user. The client device 102 may be implemented using a standalone personal computer, a portable computer (e.g., a laptop, a tablet computer, or a handheld computing device), a computer integrated into another device or system (e.g., a "smart" television, a smartphone, or a smartwatch), or any other device or platform including at least one processor, some form of memory, and a user interface to allow a user to interact with the client device 102. The user interface may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the client device 102.

The client device 102 is capable of communicating with a remote server system 106 via a data communication network 108. The data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The server system 106 may include one or more remotely located servers, and the server system 106 provides any data for presentation via the browser application stored, maintained, executed, and supported by the client device 102. The server system 106 may provide internet-based data, intranet-based data, chat or messaging application data, communication session identifiers or other connection data, and any applicable data originating from a potential secondary computer system 104. The server system 106 may include any number of application servers, and each server may be implemented using any suitable computer. In some embodiments, the server system 106 includes one or more dedicated computers. In some embodiments, the server system 106 includes one or more computers carrying out other functionality in addition to server operations. In exemplary embodiments, the server system 106 operates within a client-server architecture, executing programs to serve the requests of other programs (i.e., a browser application executed by the client device 102). In this example, the client device 102 acts as the client, and the server system 106 performs some tasks on behalf of the client device 102, to include providing the browser application data.

One or more application servers of the server system 106 maintains and provides web-based data which enables users to interact over the Internet or an intranet. The client device 102 interacts with the server system 106 in such a way that the client device 102 provides data communications to the server system 106 and receives data communications from the server system 106. In certain embodiments, the server system 106 may act as an intermediary for a chat messaging session between the client device 102 and the computer system 104, wherein the server system 106 receives data communications from the computer system 104 that are directed to the client device 102, wherein the server system 106 receives computer system 104 data communications and the server system 106 then forwards the computer system 104 data communications to the client device 102 as part of a particular functionality of a browser application that is maintained, executed, and utilized via the client device 102. For example, when the client device 102 initiates a chat application or messaging application via the browser application, the computer system 104 may be operated by a customer service agent or other chat participant communicating with the user of the client device 102 via the chat messaging application. However, the computer system 104 does not communicate with the client device 102 directly. Instead, the server system 106 provides chat messaging application data, including functionality associated with the chat messaging application itself, and also including transmitted messages from the agent using the computer system 104 which have been sent to the server system 106 first and then forwarded as part of the chat messaging application data communications transmitted to the client device 102 throughout the duration of the chat messaging session.

During typical operation, the client device 102 executes a browser application and opens a first presentation interface for the browser application, wherein the first presentation interface establishes a communication session with the server system 106 to exchange communications between the client device 102 and the server system 106. The communication session is associated with one distinct session identifier, and the communication session is the sole, exclusive communication thread established between the browser application and the server system 106, irrespective of the number of open browser-based presentation interfaces. The first presentation interface is a browser tab or browser window that provides a corresponding chat messaging interface or "chat window" through which a user can exchange chat messages with other parties. The user of the client device 102 can use the chat messaging interface to exchange messages with a live agent operator of the computer system 104, or with an automated agent (e.g., a "chat-bot") configured to exchange chat messages with users originating from the computer system 104 or the server system 106. Chat messages exchanged via the chat messaging interface may include text-based messages that include plain-text words only, and/or rich content messages that include graphical elements, enhanced formatting, interactive functionality, or the like.

The client device 102 proceeds to open one or more additional presentation interfaces (i.e., browser windows, browser tabs), and implements a master/slave model for the plurality of presentation interfaces such that only the one single, individual communication session is maintained by the master presentation interface to communicate with the server system 106, and each of the slave presentation interfaces transmits data to, and receives data from, the server system 106 via the established communication session of the master presentation interface. Thus, a browser-based, client-side solution is implemented to permit communications between the server system 106 and the plurality of presentation interfaces of the client device 102. Each opened presentation interface presents another chat messaging interface, and the same chat messaging session is maintained and presented via each new chat messaging interface. When new browser windows or new browser tabs are opened and new chat messaging interfaces are presented, text-based messages are typically maintained and presented for the chat messaging session. However, rich content messages are typically converted to a text-based format for newly-opened presentation interfaces and corresponding chat messaging interfaces. However, as described herein, the client device 102 is configured to implement a browser-based solution to locally store and retrieve rich content, such that any number of open presentation interfaces (e.g., browser tabs, windows) may exchange rich content messages via the chat messaging interface wherein the rich content of each chat message is maintained and presented in a rich content format on each new presentation interface.

Figure 2:
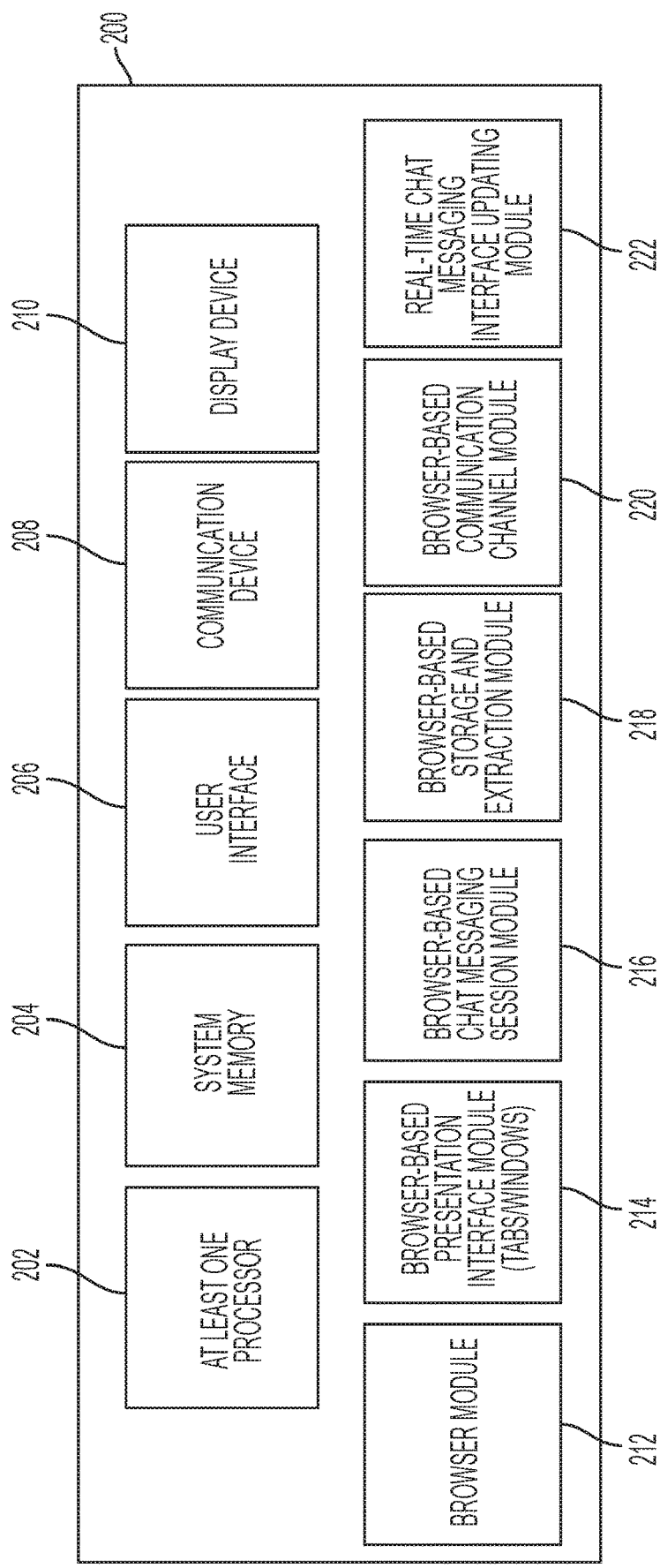
FIG. 2 is a functional block diagram of a computer system implemented as a client device communicating with a server system using a client-side, browser-based, single communication session for a plurality of browser-based presentation interfaces, in accordance with the disclosed embodiments.

FIG. 2 is a functional block diagram of a computer system implemented as a client device communicating with a server system using a client-side, browser-based, single communication session for a plurality of browser-based presentation interfaces, in accordance with the disclosed embodiments. It should be noted that the client device 200 corresponds to the client device 102 of FIG. 1. The client device 200 generally includes, without limitation: at least one processor 202; a system memory element 204; a user interface 206; a communication device 208; a display device 210; a browser module 212; a browser-based presentation interface module 214; a browser-based chat messaging session module 216; a browser-based storage and extraction module 218; a browser-based communication channel module 220; and a real-time chat messaging interface updating module 222. These elements and features of the client device 200 may be operatively associated with one another, coupled to one another, or otherwise configured to cooperate with one another as needed to support the desired functionality, as described herein. For ease of illustration and clarity, the various physical, electrical, and logical couplings and interconnections for these elements and features are not depicted in FIG. 2. Moreover, it should be appreciated that embodiments of the client device 200 will include other elements, modules, and features that cooperate to support the desired functionality. For simplicity, FIG. 2 only depicts certain elements that relate to the techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 communicates with system memory 204. The system memory element 204 is configured to store and maintain executable instructions, programming elements, computer hardware and software specifications and configurations, and any other data required for the performance of the client-side, browser-based chat-messaging communication techniques described herein. The system memory 204 may be realized using any number of devices, components, or modules, as appropriate to the embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the at least one processor 202. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the client device 200 via a browser software application connected to a server system (described previously with respect to FIG. 1). The user interface 206 may include or cooperate with various features to allow a user to interact with the client device 200 and, more particularly, to allow a user to interact with the browser application. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the client device 200. Further, and as described herein, the user interface module 206 may initiate the creation and maintenance of presentation interfaces (e.g., browser windows and/or browser tabs) implemented as graphical user interfaces (GUIs), rendered on a display device 210. In certain embodiments, the display device 210 implements touch-sensitive technology for purposes of interacting with the GUI. Thus, a user can manipulate the GUI by moving a cursor symbol rendered on the display device 210, or by physically interacting with the display device 210 itself for recognition and interpretation. Using input keyboard commands and/or touch-screen commands (among other types of input commands), the user could manipulate the GUI to interact with a browser application to access and interact with various applications, widgets, or features associated with the browser application.

In particular, the user interface module 206 presents GUI elements, widgets, and/or components associated with initiating and participating in a chat messaging session, including providing a chat messaging interface as an included component of a presentation interface, wherein the chat messaging interface is configured to present chat messaging data (e.g., user input chat messages received via the user interface 206, and chat messages received from the server system via the single communication session referenced in FIG. 1). The user interface module 206 is further configured to provide text-based chat messaging data and rich-content chat messaging data via the chat messaging interface, and to support and maintain continuity by presenting rich content chat messaging data across multiple open and active chat messaging interfaces (i.e., chat windows, chat screens, chat widgets) provided by all open browser tabs and browser windows for the browser application.

The communication device 208 is suitably configured to communicate data between the client device 200 and one or more remote servers (which may provide the client device 200 with server system data and/or potentially additional communication data from an optional second participant computer system, shown as reference 104 in FIG. 1). The communication device 208 may transmit and receive communications over a wireless local area network (WLAN), the Internet, a satellite uplink/downlink, a cellular network, a broadband network, a wide area network, or the like. As described in more detail below, data received by the communication device 208 may include, without limitation: browser application data, communication session identifier data, chat messaging session connection data, text-based chat messaging data, rich content chat messaging data, and other data compatible with the client device 200. Data provided by the communication device 208 may include, without limitation, user interactions with a chat messaging session, including user input text-based chat messaging data, rich content chat messaging data, user input selections and interactions with rich content chat messaging data, and the like.

The display device 210 is configured to display various icons, text, and/or graphical elements associated with a browser application, a plurality of presentation interfaces (e.g., browser windows, browser tabs) for the browser application, chat messaging interfaces (e.g., chat windows, chat widgets, chat components) for the browser application, text-based chat messaging data, and rich content chat messaging data, for the client device 200. In an exemplary embodiment, the display device 210 is communicatively coupled to the user interface 206 and the at least one processor 202. The at least one processor 202, the user interface 206, and the display device 210 are cooperatively configured to display, render, or otherwise convey one or more graphical representations or images associated with the browser application and a plurality of presentation interfaces on the display device 210, as described in greater detail below. In an exemplary embodiment, the display device 210 is realized as an electronic display configured to graphically display browser application data and presentation interface data, as described herein. In some embodiments, the display device 210 is implemented as a display screen of a stand-alone, personal computing device (e.g., laptop computer, tablet computer). It will be appreciated that although the display device 210 may be implemented using a single display, certain embodiments may use additional displays (i.e., a plurality of displays) to accomplish the functionality of the display device 210 described herein.

The browser module 212 is suitably configured to provide internet browser functionality for the client device 200, including the ability to locate, retrieve, and present websites requested by the client device 200 for user interaction via the client device 200. The browser module 212 is configured to open, maintain, and update a plurality of browser-based presentation interfaces (e.g., browser windows, browser tabs), in response to user input commands to open additional browser windows or tabs during browsing of a particular website, to navigate various links within a particular website which may open additional browser windows or tabs, and/or to refresh operation of a particular website. The browser module 212 is therefore configured to receive user input data to the browser application such that a user may make selections, navigate websites for the internet and/or an intranet, request server-based data, participate in chat messaging sessions, and to render text-based chat messaging data and rich content chat messaging data across a plurality of open browser windows and browser tabs simultaneously.

Further, the browser module 212 includes session storage that is associated with one particular presentation interface of the browser application, and local storage that is accessible to all open presentation interfaces of the browser application. The browser module 212 permits the opened presentation interfaces to access and use the local storage, and permits a first presentation interface to access session storage corresponding to the first presentation interface. Thus, the browser module 212 enables opened presentation interfaces to exchange data communications with other opened presentation interfaces, and enables each presentation interface to maintain stored data that remains inaccessible to other opened presentation interfaces unless transmitted or broadcast by the associated presentation interface (via the browser-based communication channel module 220).

The browser-based presentation interface module 214 is configured to provide a plurality of presentation interfaces, via the browser application, for user interaction with the browser application. A presentation interface is a graphical user interface (GUI) associated with the browser application, the GUI configured to present a document or panel including website data, text-based elements, graphical elements, user-selectable elements (e.g., menus, hyperlinks), and any other web-based, visually-presented graphic or text element configured to convey website data and/or to receive user input data. Presentation interfaces are generally implemented as browser windows or browser tabs. The browser-based presentation interface module 214 presents a first presentation interface when the browser application is executed, and is generally configured to open additional presentation interfaces in response to user input commands received via the user interface 206.

The browser-based chat messaging session module 216 is configured to establish and maintain a chat messaging session for the browser application. When the browser application is executed, a presentation interface (e.g., browser window, browser tab) is opened. The browser-based chat messaging session module 216 presents a chat messaging interface for a user of the client device 200 to use to conduct a chat messaging session. The chat messaging interface is a graphical element (e.g., window, widget, component) provided by a presentation interface that provides a visual representation of chat messaging data, and that enables a user to communicate with another chat participant. Typically, a chat messaging interface is implemented as a widget or window-inside-browser-window that is smaller than the browser tab or browser window (i.e., browser presentation interface GUI). The chat messaging interface is configured to present (1) user-entered communications, received via the user interface 206 of the client device 200, and (2) communications received by the client device and directed to the user from other chat participants, received by the client device 200 via the communication device 208 using a data communication network (reference 108 of FIG. 1).

The chat messaging interface is further configured to present communications from the user of the client device and other chat participants (e.g., an agent, a chat-bot) using a plain-text format and/or a rich content format. Communications transmitted and received via the chat messaging interface are referred to as "chat messaging data", which includes at least one of text-based chat messages and rich content chat messages. Text-based chat messages are appropriately named to describe exactly what is included: a plain-text message transmitted without requiring particular formatting or other visual effects. Plain-text messages include human-readable sequences of characters that form words and phrases, and that may be encoded into computer-readable formats (e.g., American Standard Code for Information Interchange (ASCII)).

Rich content chat messages may include rich content only, or any combination of text and rich content. Rich content may include graphical elements, enhanced formatting, interactive functionality, and the like. Graphical elements include pictures, symbols, icons, and any other visual representation displayed as part of a presentation interface (i.e., browser window, browser tab). Enhanced formatting refers to visually augmented text representations that include color, styling (e.g., bold text, italic text), text sizing, and other Hyper-Text Markup Language (HTML) features (e.g., hyperlinks). Text representations with enhanced formatting may also be referred to as formatted text, styled text, or rich text. Interactive functionality refers to graphical elements configured to receive user input, such as a graphical button for virtual "push" via user click/selection, a radio button filled in by user selection, a check-box that is "checked" by user selection, a picture or icon that is highlighted, framed, or otherwise indicated as selected by user click/selection, a graphical dial or slider configured for user adjustment, or the like. Interactive functionality of rich content includes any visual representation configured for user interaction and displayed via a chat messaging interface.

A chat messaging session is a conversation or, in other words, a chat messaging session is an exchange of messages between chat participants, wherein one of the chat participants is a user of the client device 200. The chat messaging session is a concept different from a chat messaging interface, as follows: the chat messaging session is the conversation, and the chat messaging interface is the graphical element through which the conversation is conducted and presented by the client device 200. The chat messaging session is also a concept different from the communication session established between the master presentation interface and the remote server system. The chat messaging session is an exchange of communications during one particular conversation between defined parties, wherein the communication messages are exchanged between the client device 200 and the remote server system. The chat messaging session begins when a user of the client device 200 provides a user input command to begin, execute, or otherwise initiate the chat messaging session, via a presentation interface of the browser application. Generally, a user clicks a link on a particular website to begin the chat messaging session, wherein the link is provided via a presentation interface, and wherein user selection of the link executes a chat messaging interface through which the user may conduct the chat messaging session by communicating with one or more defined parties. Once the conversation (i.e., the chat messaging session) between the defined parties has begun, the The browser-based storage and extraction module 218 is configured to enable the browser application to store rich content chat messages (received via the browser-based chat messaging session module 216) such that the rich content is preserved when the stored rich content messages are later retrieved for viewing via a second chat messaging interface on a second presentation interface. In other words, the browser-based storage and extraction module 218 functions to ensure that rich content chat messages received using a chat interface of a first browser window or browser tab, may be viewed in the original rich content format using a chat messaging interface presented by a different browser window or browser tab of the browser application. To preserve the rich content characteristics, the browser-based storage and extraction module 218 is configured to use a particular storage format and a particular storage location compatible with the browser-based, client-side communication. More specifically, the browser-based storage and extraction module 218 stores rich content chat messaging data as JavaScript Object Notation (JSON) objects in session storage of the master presentation interface. When stored as a JSON object, the characteristics of a rich content chat message are retained, such that when a new browser window or browser tab is opened and the chat messaging session is continued using the new browser window or tab, then the rich content chat message is extracted from the session storage of the master window/tab as a JSON object and presented as a rich content chat message on the new browser window/tab. As described previously, chat messages may be text-based chat messages that are presented in a plain-text format and/or rich content chat messages that are presented using rich content (described previously with regard to the browser-based presentation interface module 214), as shown in FIG. 3.

Figures 3, 4:
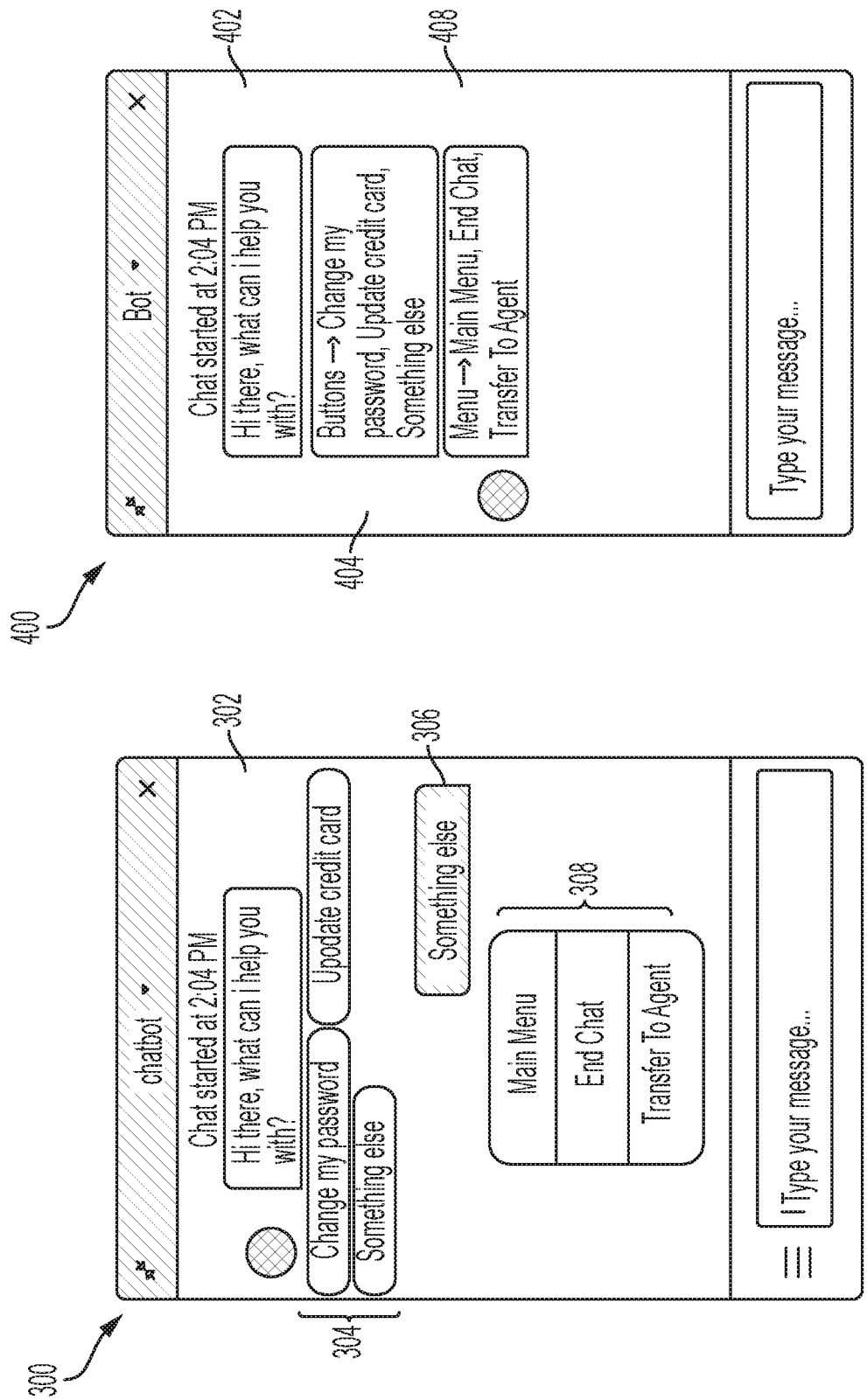
FIG. 3 is a diagram of an embodiment of a chat messaging interface 300 configured to render rich content chat messages and text-based chat messages, in accordance with the disclosed embodiments.
FIG. 4 is a diagram of an embodiment of a chat messaging interface configured to render a text-based version of rich content extracted from browser-based storage, in accordance with the disclosed embodiments.

FIG. 3 is a diagram of an embodiment of a chat messaging interface 300 configured to render rich content chat messages and text-based chat messages. As shown, the chat messaging interface 300 presents chat messages for one particular chat messaging session between a user of a client device (see reference 102, FIG. 1; reference 200, FIG. 2) and a "chat-bot" (i.e., an automated chat participant for providing chat messaging data to a user during a chat messaging session). The first chat message includes a text-based chat message 302 and a rich content chat message 304 received from the chat-bot to initiate the chat conversation. The text-based chat message 302 is a plain-text question "Hi there, what can I help you with?", and the rich content chat message 304 is a set of graphical elements provided for user interaction. In this scenario, the rich content chat message 304 includes three graphical buttons that a user may select to provide user input to the chat-bot. As shown, the graphical buttons include potential user input responses including: (1) "Change my password", (2) "Update credit card", and (3) "Something else". The chat messaging interface 300 shows that the user has provided the user input response "Something else" by selecting the appropriate graphical element, as shown by the displayed text-based message 306 that includes the text representation "Something else". The chat messaging interface 300 also presents a graphical element below the chat messages, wherein the graphical element is a menu 308 of additional user-selectable options from which the user may select to view the "Main Menu" for the chat-bot to present other user-selectable options; the user may select to "End Chat" to terminate the chat messaging session with the chat-bot; and the user may select to "Transfer to an Agent" to transfer the conversation from the chat-bot as the chat participant exchanging chat messages with the user to a live human agent operating a computer system (see reference 104, FIG. 1) as the chat participant exchanging chat messages with the user. As shown in FIG. 3, the chat messaging interface 300 is capable of presenting both text-based chat messages and rich content chat messages.

Returning to FIG. 2, typically, the client device 200 stores chat messages using a string format for later retrieval and use by a browser application. However, if a chat message that includes rich content (i.e., a rich content chat message) is stored in a string format for later retrieval and presentation via the chat messaging interface, then the rich content characteristics of the rich content chat message would be lost and, upon retrieval from storage, the rich content chat message would instead be displayed in a plain-text format, as shown in FIG. 4.

FIG. 4 is a diagram of an embodiment of a chat messaging interface 400 configured to render a text-based version of rich content that has been extracted from browser-based storage. FIG. 4 is one embodiment of typical operation of a chat messaging interface 400 provided by a browser window or browser tab (i.e., a presentation interface), wherein the chat messaging interface 400 does not include any mechanism for preserving rich content when the browser window or tab has been refreshed or when the user opens a second browser window or tab (i.e., a slave presentation interface) in addition to the first browser window or tab (i.e., the master presentation interface)

Like the chat messaging interface shown in FIG. 3, the chat messaging interface 400 presents chat messages for one particular chat messaging session between a user of a client device (see reference 102, FIG. 1; reference 200, FIG. 2) and a "chat-bot" (i.e., an automated chat participant for providing chat messaging data to a user during a chat messaging session). However, the chat messaging interface 400 of FIG. 4 differs from the chat messaging interface 300 of FIG. 3, due to a lack of rich content displayed. In FIG. 3, the chat messaging interface 300 presents chat messaging data that includes text-based chat messages and rich content chat messages. In contrast, the chat messaging interface 400 of FIG. 4 retrieves the displayed chat messaging data from session storage of the master presentation interface, wherein the chat messaging data is presented as plain-text representations, indicating that the rich content chat messages were converted into a string format before storage in the session storage of the master presentation interface.

As shown, the first chat message includes a text-based chat message 402 and a converted rich content chat message 404 that has been retrieved from session storage of the master presentation interface. The text-based chat message 402 and the converted rich content chat message 404 were originally received by the master presentation interface via the single communication session, and from the chat-bot to initiate the chat conversation. However, in the illustrated scenario, the chat session interface 400 is a slave presentation interface that is either newly-opened or just refreshed by the user. Generally, the rich content chat messages are text-based due to browser window/tab refresh or due to opening a new browser window/tab. In both situations, the chat messaging interface 400 extracts a stored version of the chat messaging session from session storage of the master presentation interface to display the stored version via the chat messaging interface 400. Thus, the chat session interface 400 has retrieved the chat session data from session storage of the master presentation interface.

Like FIG. 3, the text-based chat message 402 is a plain-text question "Hi there, what can I help you with?" However, unlike FIG. 3, the converted rich content chat message 404 does not include rich content (e.g., graphical elements provided for user interaction). In this scenario, the converted rich content chat message 404 includes a plain-text representation of the three graphical buttons: (1) "Change my password", (2) "Update credit card", and (3) "Something else". The chat messaging interface 400 also presents a second converted rich content element 408 below the chat messages, wherein the second converted rich content element 408 is a plain-text representation of the menu of additional user-selectable options (e.g., "Main Menu", "End Chat", "Transfer to an Agent"). As shown in FIG. 4, the chat messaging interface 400 is capable of presenting text-based chat messages and converted rich content chat messages that have been converted into a plain-text format.

To solve this problem, as described herein, the client device (reference 102, FIG. 1; reference 200, FIG. 2) is configured to store the chat messaging data in session storage of the master presentation interface in a JavaScript Object Notation (JSON) object format, such that the rich content characteristics of the chat messaging data are retained and displayed via a slave presentation interface that is newly-opened or refreshed by a user.

Returning to FIG. 2, thus, the browser-based storage and extraction module 218 stores chat messaging data using a storage format and storage location such that rich content chat messages retain rich content characteristics, preventing inadvertent conversion of rich content chat messages (and formatting, visual effects, and interactive capabilities of the rich content chat messages) into plain-text format when stored by the browser application and later retrieved for use. The chat messaging data is stored in session storage for the master presentation interface, and the session storage is propagated to other open browser tabs and browser windows via a broadcast pipeline of the browser application.

Rich content chat messages are locally stored by the browser application in session storage of a particular presentation interface as JSON objects, and the broadcast pipeline is used to transmit the JSON objects to other open presentation interfaces such that the rich content chat messages are presented in a rich content format across all open presentation interfaces. Continuity of rich content chat messages (across all open presentation interfaces for the browser application) is thus provided through the storage format for the rich content chat messages (e.g., JSON object storage), and the retrieval method for the rich content chat messages (e.g., obtaining rich content chat messages via the broadcast pipeline for the browser application).

The browser-based communication channel module 220 is configured to perform internal and external communication functions for the client device 200. The browser-based communication channel module 220 includes two separate and distinct aspects: (1) establishing and maintaining one single, distinct, individual communication session between a master presentation interface and one or more remotely located servers, via the communication device 208; and (2) establishing and maintaining a broadcast pipeline for the plurality of presentation interfaces to communicate among themselves by broadcasting data transmissions to all open presentation interfaces of the browser application, which are received by those presentation interfaces that are configured to "listen" for applicable and relevant broadcasted data. As described herein, a distinct and individual communication session is a data transfer thread between the server system and a particular aspect of the client device which receives server-based data via the communication session. A master browser window or master browser tab (presented as part of the executed browser application) is an aspect of the client device capable of initiating and maintaining the communication session. Slave windows or tabs communicate with the one or more servers by broadcasting data to be received by the master presentation interface, and the master presentation interface is configured to transmit the received data to the one or more servers.

As described herein, each of the open presentation interfaces of the browser application is capable of presenting a chat messaging interface to enable a user of the client device 200 to participate in a chat messaging session wherein the user provides user input chat messages to the client device 200 and the user receives chat messages from a second chat participant via the distinct communication session between the client device 200 and a remote server system. (As described with regard to FIG. 1, chat messages received by the client device 200 may be from a live agent user of the computer system 104 or from an automated "chat-bot" implemented via the computer system 104 or the remote server system 106. In either case, the server system 106 that has the communication session with the client device 102 receives all chat communications and then directs and transmits the chat communications to the appropriate receiving computer system/client device/receiving party.) Chat messaging interfaces, displayed and associated with corresponding presentation interfaces, are configured to present chat messages in a plain-text format and in a rich content format. The browser-based communication channel module 220 is thus configured to provide a communication channel for transmitting chat messaging data that includes both plain-text chat messaging data and rich content chat messaging data.

The real-time chat messaging interface updating module 222 is configured to dynamically update all presentation interfaces of the browser application, in real-time, such that all open presentation interfaces (and corresponding chat messaging interfaces) present the same interactive data for a current chat messaging session, including rich content messages that include visual effects and interactive functionality. The real-time chat messaging interface updating module 222 is configured to use the broadcast pipeline (via the browser-based communication channel module 220) to provide updates to a master presentation interface from one or more slave presentation interfaces, and to provide updates to a set of slave interfaces from a master presentation interface. As one example, a rich content chat message received as user input to a particular slave presentation interface is provided to the master presentation interface via the broadcast pipeline as an update, which may then be provided via the broadcast pipeline from the master presentation interface to all open slave presentation interfaces. In this scenario, all open presentation interfaces and corresponding chat messaging interfaces are dynamically updated to include the user input rich content chat message, in real-time. As another example, a rich content chat message may be received by the master presentation interface from a remote server via the one distinct communication session between the master presentation interface and the remote server, and the rich content chat message may then be provided via the broadcast pipeline from the master presentation interface to all open slave presentation interfaces. In this scenario, all open presentation interfaces and corresponding chat messaging interfaces are dynamically updated to include the server-provided rich content chat message, in real-time.

Figure 5A:
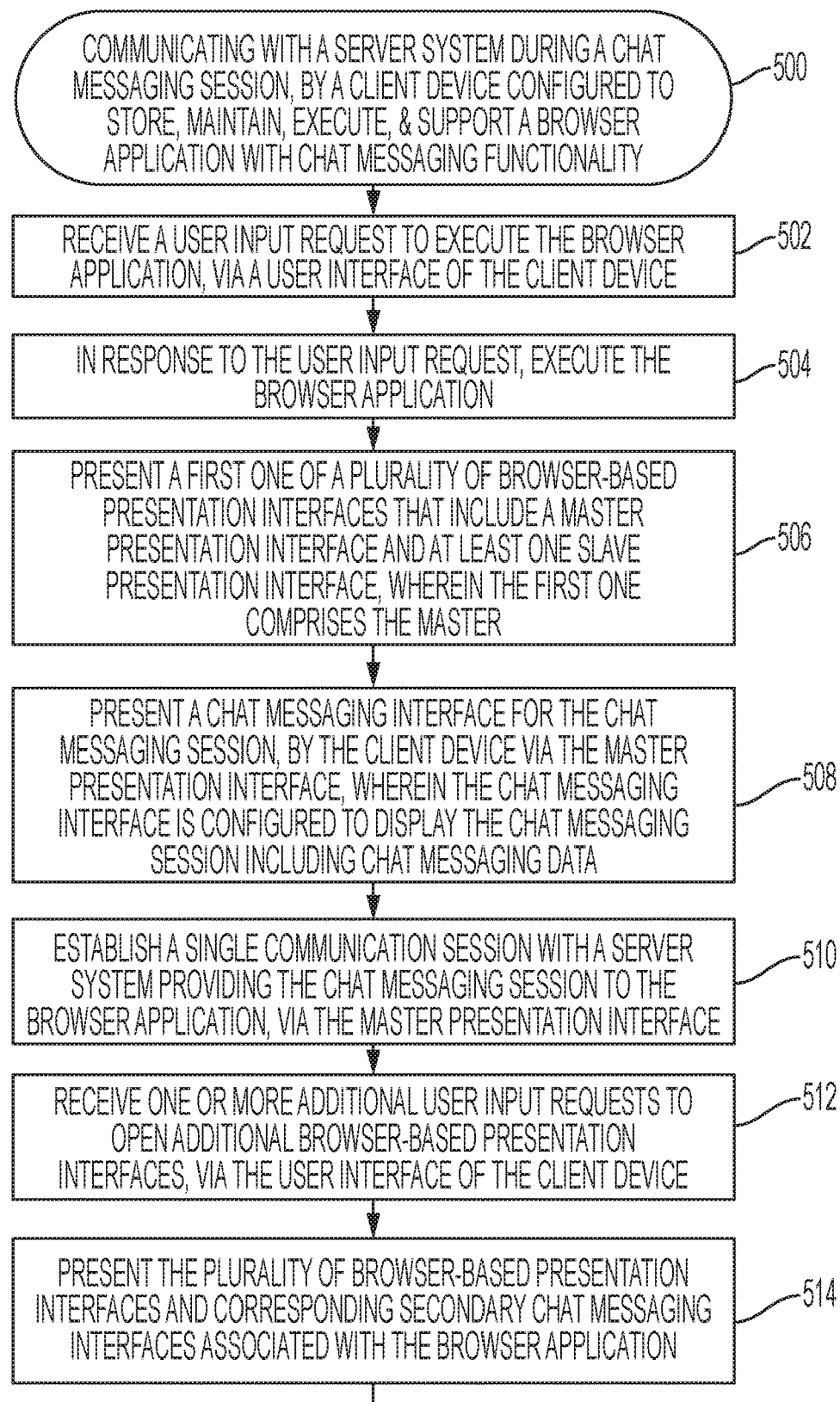
FIGS. 5A-5B are flow charts that illustrate an embodiment of a process for communicating with a server system during a chat messaging session, by a client device configured to store, maintain, execute, and support a browser application with chat messaging functionality, in accordance with the disclosed embodiments.
Figure 5B:
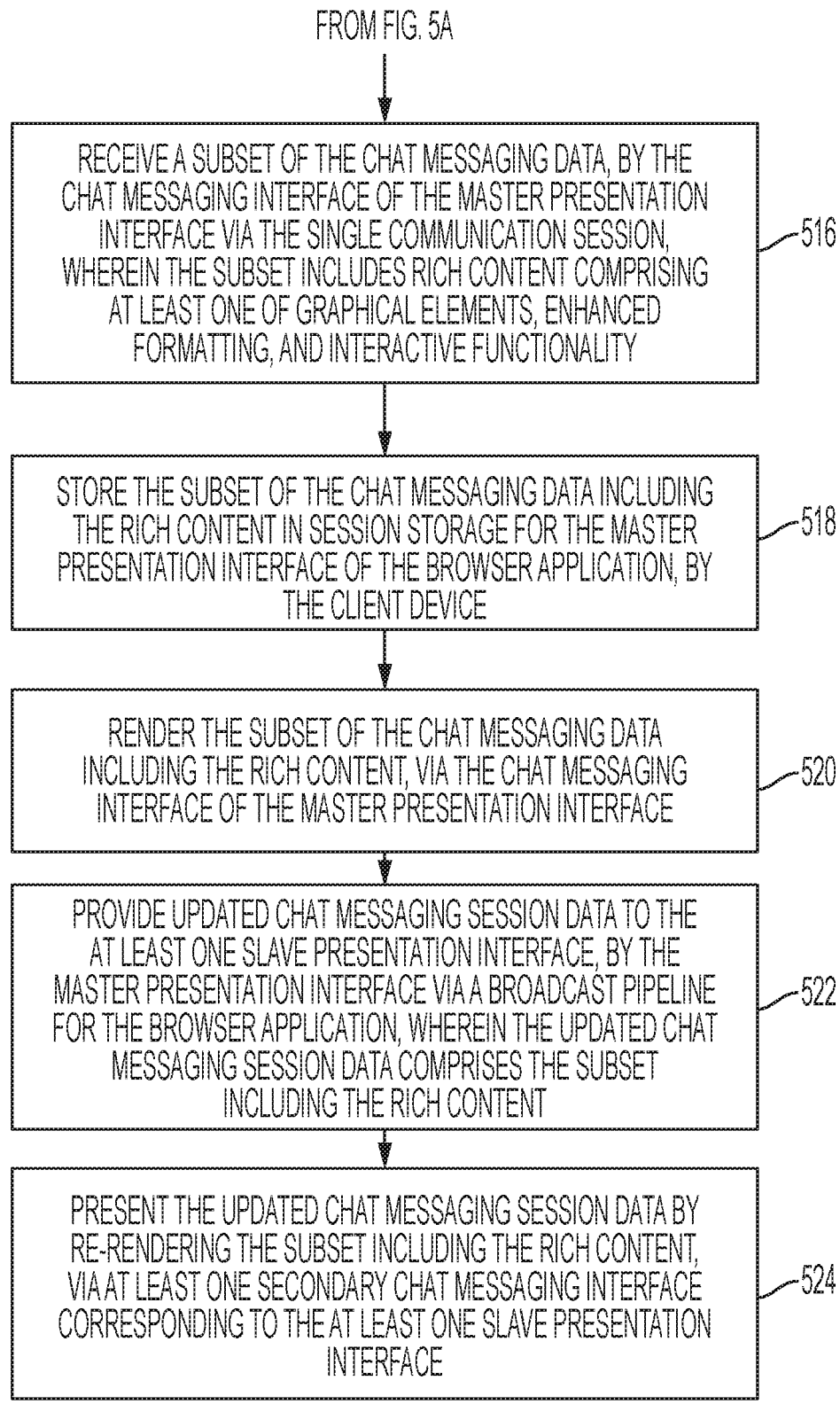

FIGS. 5A-5B are flow charts that illustrate an embodiment of a process 500 for communicating with a server system during a chat messaging session, by a client device configured to store, maintain, execute, and support a browser application with chat messaging functionality, in accordance with the disclosed embodiments. For ease of description and clarity, it is assumed that the process 500 begins by receiving a user input request to execute the browser application, via a user interface of the client device (step 502). As described herein, the client device is implemented as a computer system that is in communication with one or more servers (e.g., server system 106 of FIG. 1), and the user input request may be received via an applicable touchscreen or other hardware element communicatively coupled to the client device (e.g., user interface 206 of FIG. 2). The user input request to execute the browser application may be a user selection of a graphical element, a menu option, a data input field, or the like.

In response to the received user input request (step 502), the process 500 executes the browser application, by the client device (step 504); presents a first one of a plurality of browser-based presentation interfaces, by a display element of the client device (step 506); presents a chat messaging interface for the chat messaging session, by the client device via the master presentation interface (step 508); and establishes a single communication session with a server system providing the chat messaging session to the browser application, via the master presentation interface and a communication device of the client device (step 510). Generally, the user executes the browser by selecting a graphical element representing the browser, via a user interface of the client device, wherein the graphical element is presented by the client device. The process 400 presents a browser-based presentation interface comprising a graphical user interface (GUI) associated with the browser application, the GUI configured to present a document or panel that includes website data, text-based elements, graphical elements, user-selectable elements (e.g., menus, hyperlinks), and any other web-based, visually-presented graphic or text element configured to convey website data and/or to receive user input data. The GUI is also configured to provide a chat messaging interface, which may be implemented as a presentation interface component, framed window, or other graphical element presented by the presentation interface for displaying chat messaging data for a particular chat messaging session.

As described herein, a browser-based presentation interface is generally implemented as a browser window or a browser tab. Browser windows and tabs are well-known and commonly-used presentation interfaces for user interaction with a computer system (e.g., the client device). Browser windows and browser tabs are two-dimensional graphical control elements that include a visual presentation area (i.e., document or panel) surrounded by a frame, wherein the frame generally includes one or more graphical elements for user manipulation to move and resize the window or tab. Browser windows and tabs are typically rectangular in shape, to accommodate a typically shaped display device (e.g., reference 210 of FIG. 2). Browser windows can be moved, expanded to fill an entire display area of a display device (e.g., reference 210 of FIG. 2), resized, hidden and restored, closed, and can overlap (partial overlap or complete overlap) with other browser windows presented by the display device. Browser tabs are similar in form and function to browser windows, but browser tabs provide functionality to allow multiple documents or panels to be included and presented as part of a single browser window, wherein each tab is used as a navigational widget for user-selection to switch between the documents or panels (i.e., switch between the tabs).

Here, the process 500 receives the user input command to execute the browser application (step 502), executes the browser application and presents a browser-based presentation interface, such as a browser window or a browser tab inside a browser window that also includes a chat messaging interface (steps 504, 506, 508), and establishes a single communication session between the browser window or browser tab and the server system (step 510). As described herein, each browser window tab communicates with one or more servers (e.g., server system 106 of FIG. 1) via a communication session. A communication session is a data transfer thread between the server system and a particular aspect of the client device which receives server-based data via the communication session. Each browser window or browser tab (presented as part of the executed browser application) is an aspect of the client device capable of initiating, maintaining, and using an individually identifiable communication session for transmitting data messages to, and receiving data messages from, the server system. Here, each data message exchanged between the server system and the browser window or browser tab is associated with a session identifier (i.e., a session ID), which differentiates session communications for various communication sessions, thus enabling the server system to communicate with a plurality of aspects of various client devices simultaneously and to keep each communication session separate and distinct.

After establishing the single communication session between the first browser-based presentation interface (step 510), the process 500 receives one or more additional user input requests to open additional browser-based presentation interfaces, via the user interface of the client device (step 512), and presents the plurality of browser-based presentation interfaces and corresponding secondary chat messaging interfaces associated with the browser application (step 514). The user input requests to open additional browser-based presentation interfaces may include requests to open additional browser windows, requests to open additional browser tabs in the same browser window, or requests to open a combination of both browser windows and browser tabs. Here, the process 500 receives a user request to present at least a second presentation interface, in addition to the first presentation interface associated with the single communication session, and simultaneously presents the first presentation interface and at least the second presentation interface via the display element (e.g., reference 210 of FIG. 2) of the client device (e.g., reference 102 of FIG. 1, reference 200 of FIG. 2). Further, each of the browser tabs and/or browser windows opened in response to the user input requests presents a corresponding chat messaging interface through which a user may conduct a chat messaging session using the client device. Each newly-opened presentation interface is configured to present new, refreshed, or otherwise updated website data associated with the current browsing session for the browser application. Similarly, each of the newly-opened, corresponding chat messaging interfaces is configured to present new, refreshed, or otherwise updated chat messaging session data for the current chat messaging session. Thus, the process 500 provides dynamic updates, in real-time, to each of the browser-based presentation interfaces and each of the browser-based chat messaging interfaces.

The process 500 then receives a subset of the chat messaging data, by the chat messaging interface of the master presentation interface via the single communication session (step 516). Here, the process 500 receives chat messages by the master presentation interface of the client device, wherein the chat messages are received from the remote server system via the established single communication session. The received chat messaging data (i.e., the subset) includes rich content comprising at least one of graphical elements, enhanced formatting, and interactive functionality. Here, a user of the client device is communicating with another chat participant during a chat messaging session using a chat messaging interface. The chat messaging interface is provided by a "master" browser tab or browser window. During the chat messaging session, the user (via the client device) receives rich content messages that include features beyond a plain-text representation, including interactive graphical elements and enhanced formatting or styling.

Next, the process 500 stores the subset of the chat messaging data including the rich content in session storage for the master presentation interface of the browser application, by the client device (step 518). Generally, once rich content chat messages have been received by the process 500, the process 500 stores the rich content chat messages in session storage of the master presentation interface, for future propagation to slave presentation interfaces via the broadcast pipeline of the browser application, or for future transmission to the remote server system via the single communication connection between the master presentation interface and the remote server system. In this scenario, the rich content chat messages have been received by the process 500 from the remote server system for transmission to a currently active chat messaging interface. Thus, the process 500 stores the server-initiated communications in session storage for the master presentation interface, for future propagation to all open slave presentation interfaces via the broadcast pipeline of the browser application.

The process 500 also renders the subset of the chat messaging data including the rich content, via the chat messaging interface of the master presentation interface (step 520). When chat messaging data is received from the remote server system, each open browser tab or window (i.e., each open presentation interface) and each corresponding chat messaging interface are dynamically updated, in real-time, such that each of the chat messaging interfaces presents the same data for the same chat messaging session. Here, the process 500 has received new chat messaging data, by the master presentation interface and from the remote server system; the process 500 stores the new chat messaging data; and the process 500 displays the new chat messaging data using the chat messaging interface of the master presentation interface. Since the chat messaging data has been received directly from the remote server system, the rich content chat messages are intact and include the rich content. Thus, when the process 500 renders the subset of the chat messaging data, the rendering of the chat messages includes the rich content.

The process 500 then provides the updated chat messaging data to the at least one slave presentation interface, by the master presentation interface via the broadcast pipeline for the browser application, wherein the updated chat messaging session data comprises the subset including the rich content (step 522). Here, the process 500 provides the rich content chat messages that have been stored in session storage of the master presentation interface to the slave presentation interfaces, and the rich content chat messages are provided in a format that includes the rich content. In other words, the rich content chat messages have not been converted into a plain-text format when stored, indicating that the process 500 stored the rich content chat messages in a particular format that preserves the rich content characteristics of the rich content chat messages.

The process 500 then presents the updated chat messaging session data by re-renders the subset including the rich content, via at least one secondary chat messaging interface corresponding to the at least one slave presentation interface (step 524). As described previously with regard to step 520, the process 500 renders the originally-received rich content chat messages (including rich content characteristics) using the master presentation interface that receives the rich content chat messages directly from the remote server system. Here, the process 500 re-renders the rich content chat messages that were received from the remote server, but the re-rendering uses the stored version of the rich content chat messages that was stored in session storage of the master presentation interface. However, even though the rich content chat messaging data has been extracted from the session storage prior to display, the re-rendering does include the rich content characteristics.

Figure 6:
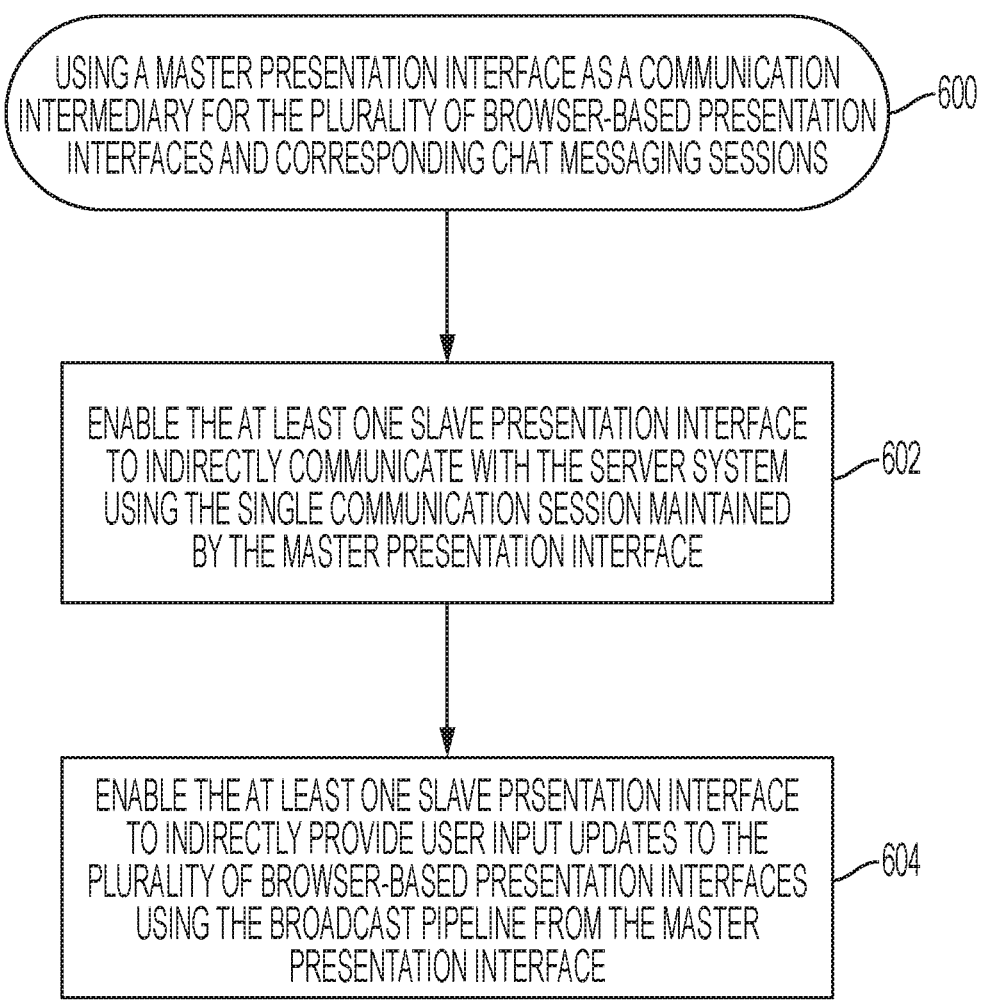
FIG. 6 is a flow chart that illustrates an embodiment of a process for using a master presentation interface as a communication intermediary for the plurality of browser-based presentation interfaces and corresponding chat messaging sessions, in accordance with the disclosed embodiments.

FIG. 6 is a flow chart that illustrates an embodiment of a process 600 for using a master presentation interface as a communication intermediary for the plurality of browser-based presentation interfaces and corresponding chat messaging sessions, in accordance with the disclosed embodiments. As described herein, the browser application uses a master-slave organization for any open browser tabs or browser windows (i.e., presentation interfaces). Generally, the first open presentation interface is the "master", which establishes an active connection (i.e., communication session) to the remote server system. Any other browser tabs or windows that are opened after the master are referred to as "slave" presentation interfaces, which do not have a direct connection to the remote server system, but which communicate with the remote server system using the master presentation interface as a communication intermediary. Additionally, the slave presentation interfaces may receive user input data updates, directly from a user of the client device, thus requiring communication from the slave to the master to transmit the updates for further propagation to the remaining slave presentation interfaces and to transmit the updates to the server system via the single communication connection. It should be appreciated that the communication arrangement is applicable to provide chat messaging updates to a chat messaging interface presented by each of the open browser tabs and/or browser windows (i.e., browser presentation interfaces).

First, the process 600 enables the at least one slave presentation interface to indirectly communicate with the server system using the single communication session maintained by the master presentation interface (step 602). Suitable methodologies for enabling a slave presentation interface to indirectly communicate with the server system using the single communication session are described below with reference to FIG. 7 and FIG. 9. Next, the process 600 enables the at least one slave presentation interface to indirectly provide user input updates to the plurality of browser-based presentation interfaces using the broadcast pipeline from the master presentation interface (step 604). One suitable methodology for enabling a slave presentation interface to indirectly provide user input updates to the plurality of browser-based presentation interfaces using the broadcast pipeline from the master presentation interface is described below with reference to FIG. 10.

Figure 7:
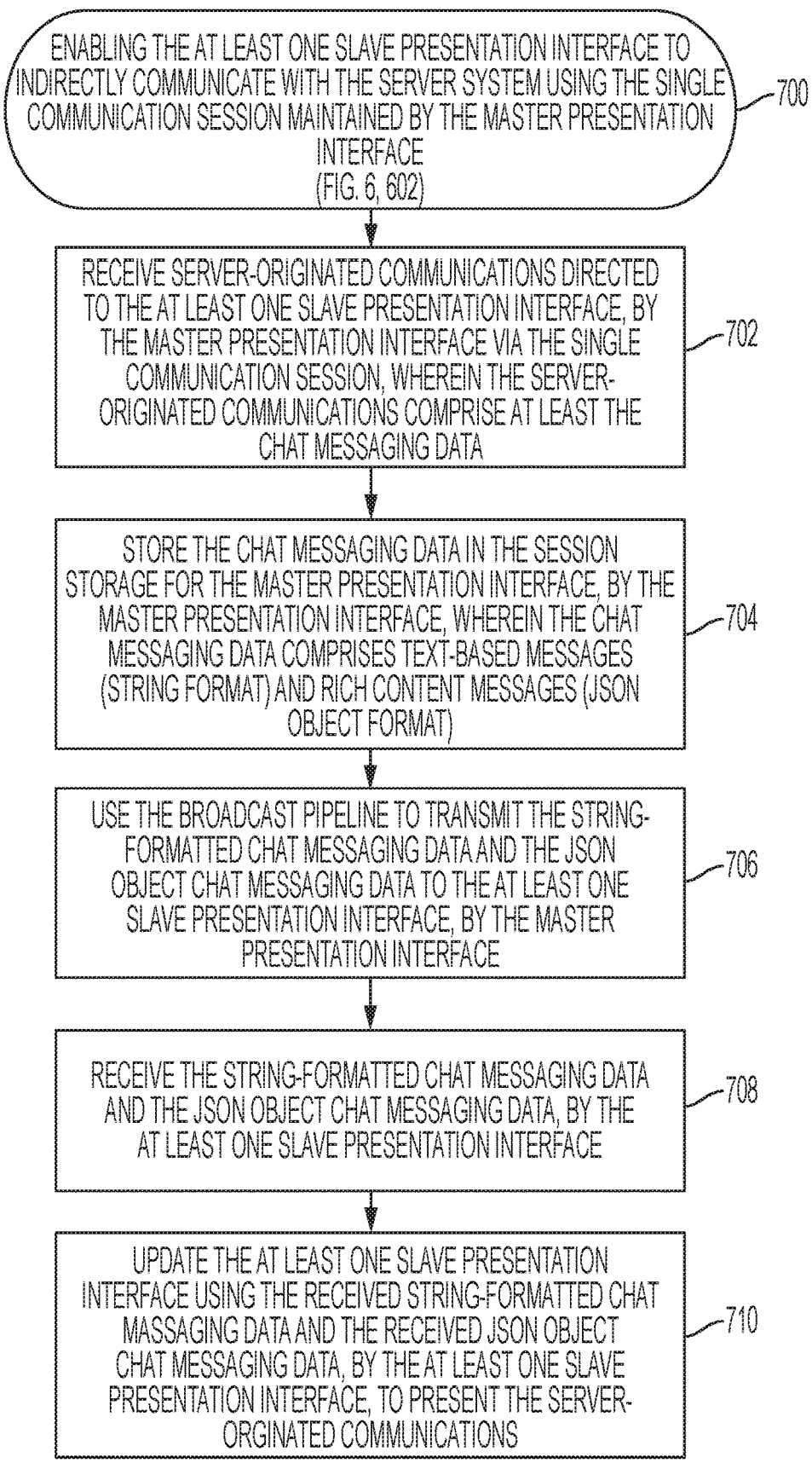
FIG. 7 is a flow chart that illustrates an embodiment of a process for enabling the at least one slave presentation interface to indirectly communicate with the server system using the single communication session maintained by the master presentation interface, in accordance with the disclosed embodiments.

FIG. 7 is a flow chart that illustrates an embodiment of a process 700 for enabling the at least one slave presentation interface to indirectly communicate with the server system using the single communication session maintained by the master presentation interface, in accordance with the disclosed embodiments. It should be appreciated that the process 700 described in FIG. 7 represents one embodiment of step 602 described above in the discussion of FIG. 6, including additional detail.

The process 700 receives server-originated communications directed to the at least one slave presentation interface, by the master presentation interface via the single communication session, wherein the server-originated communications comprise at least the chat messaging data (step 702). The server-originated communications are any chat messages from a chat-bot or other automated system implemented using the remote server system (see reference 106, FIG. 1), or from either a live agent or chat-bot using a computer system (see reference 104, FIG. 1) communicating with the remote server system. In this way, the remote server system propagates any chat messages applicable to a chat messaging session with the client device using the single communication session with the master presentation interface.

The process 700 stores the chat messaging data in the session storage for the master presentation interface, by the master presentation interface, wherein the chat messaging data comprises text-based messages and rich content messages (step 704). Here, the process 700 stores the chat messaging data in a format appropriate to the type of chat message being stored. The process 700 stores text-based chat messages in a string format in session storage, for future retrieval and display as plain text. The process 700 stores rich content chat messages in a JavaScript Object Notation (JSON) object format, to preserve the rich content characteristics for future retrieval and display as a rich content chat message.

The process 700 then uses the broadcast pipeline to transmit the string-formatted chat messaging data and the JSON object chat messaging data to the at least one slave presentation interface, by the master presentation interface (step 706). One suitable methodology for using the broadcast pipeline to transmit the string-formatted chat messaging data and the JSON object chat messaging data to the at least one slave presentation interface is described below with reference to FIG. 8. Here, the process 700 provides the received chat messaging data (received by the master presentation interface from the remote server system) to the slave presentation interfaces to update the slave presentation interfaces, such that each of the chat messaging interfaces corresponding to the master and the slaves displays the same chat messaging data. In this way, each open browser window or browser tab presents the same chat data. The process 700 receives the string-formatted chat messaging data and the JSON object chat messaging data, by the at least one slave presentation interface (step 708), and updates the at least one slave presentation interface using the received string-formatted chat messaging data and the received JSON object chat messaging data, by the at least one slave presentation interface, to present the server-originated communications (step 710). Thus, the process 700 presents the updated chat messaging data (i.e., new chat messages received from the server) via the slave presentation interfaces as well as via the master.

Figure 8:
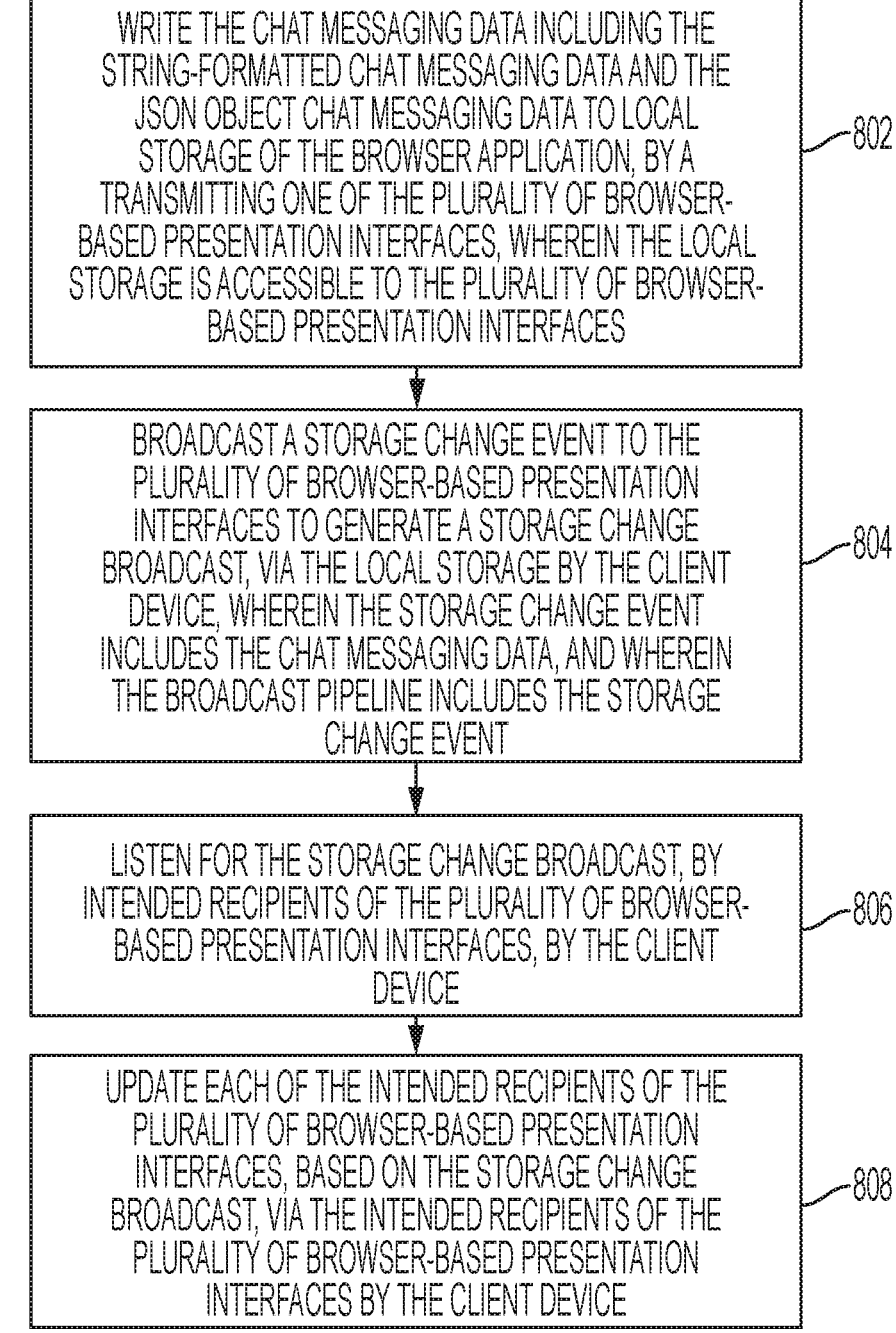
FIG. 8 is a flow chart that illustrates an embodiment of a process for using the broadcast pipeline to transmit the string-formatted chat messaging data and the JSON object chat messaging data to the at least one slave presentation interface, by the master presentation interface, in accordance with the disclosed embodiments.

FIG. 8 is a flow chart that illustrates an embodiment of a process 800 for using the broadcast pipeline to transmit the string-formatted chat messaging data and the JSON object chat messaging data to the at least one slave presentation interface, by the master presentation interface, in accordance with the disclosed embodiments. It should be appreciated that the process 800 described in FIG. 8 represents one embodiment of step 706 described in the discussion of FIG. 7, and one embodiment of step 1006 described in the discussion of FIG. 10, including additional detail.

As described previously with regard to FIG. 6, the browser application executed by a client device (see reference 102, FIG. 1; reference 200, FIG. 2) organizes open browser tabs and browser windows in a master-slave configuration, such that the master tab/window is used as an intermediary that receives all communications from the slave tabs/windows (via the broadcast pipeline of the browser application) and all communications from the remote server directed to the browser application (via the single communication session). The master tab/window then directs the received communications to the originally intended recipients, using the single communication session or the broadcast pipeline of the browser application. In one embodiment, the process 800 has received chat messaging data that has been retrieved from session storage of the master presentation interface, and provides the chat messaging data to all open slave presentation interfaces of the browser application. In another embodiment, the process 800 has received user input chat messaging data to one of the slave browser tabs/windows, and provides the user input chat messaging data to the master browser tab/window for transmission to the server system via the single communication session, for transmission to the plurality of slave browser tabs/windows via the broadcast pipeline, or for transmission to both of the above-described options.

To transmit the chat messaging data using the broadcast pipeline, the process 800 first writes the chat messaging data (including the string-formatted chat messaging data and the JSON object chat messaging data) to local storage of the browser application, by a transmitting one of the plurality of browser-based presentation interfaces, wherein the local storage is accessible to the plurality of browser-based presentation interfaces (step 802). The transmitting one of the browser-based presentation interfaces may be the master presentation interface or one of the slave presentation interfaces. Local storage is accessible to the master presentation interface and the slave presentation interfaces.

The process 800 then broadcasts a storage change event to the plurality of browser-based presentation interfaces to generate a storage change broadcast, via the local storage by the client device, wherein the storage change event includes the chat messaging data, and wherein the broadcast pipeline includes the storage change event (step 804). Typically, after a browser tab or browser window writes to local storage of the browser application, the local storage broadcasts a storage change event to all tabs or windows of the browser application. Thus, the process 800 uses the storage event mechanism of the browser application to create a broadcast channel or broadcast pipeline between the open browser-based presentation interfaces (e.g., browser windows, browser tabs).

The process 800 listens for the storage change broadcast, by intended recipients of the plurality of browser-based presentation interfaces, by the client device (step 806). The process 800 then updates each of the intended recipients of the plurality of browser-based presentation interfaces, based on the storage change broadcast, via the intended recipients of the plurality of browser-based presentation interfaces (step 808). When the presentation interface writes to the local storage, the storage change event is broadcast to all open tabs and windows (i.e., all open presentation interfaces). However, all open tabs and windows of the browser application do not necessarily receive the storage change event data. Instead, particular tabs or windows of the browser application are configured to listen for the storage change event, and to receive the storage change event data from the broadcasting presentation interface. In the example described with regard to FIG. 7, the broadcasting presentation interface is the master presentation interface that has already received an update comprising a server-initiated data transmission and the listening presentation interfaces are the set of slave presentation interfaces. The process 800 then updates each of the set of slave presentation interfaces, based on the storage change broadcast, via the set of slave presentation interfaces by the client device (step 808). Thus, the process 800 receives a server-initiated data update for the browser application via a master tab/window, and then the master tab/window communicates the data update to the set of slave tabs/windows via the broadcast pipeline to which the set of slave presentation interfaces are listening for the data update. The set of slave presentation interfaces are then updated to present the update via a display element of the client device (see reference 210 of FIG. 2).

Figure 10:
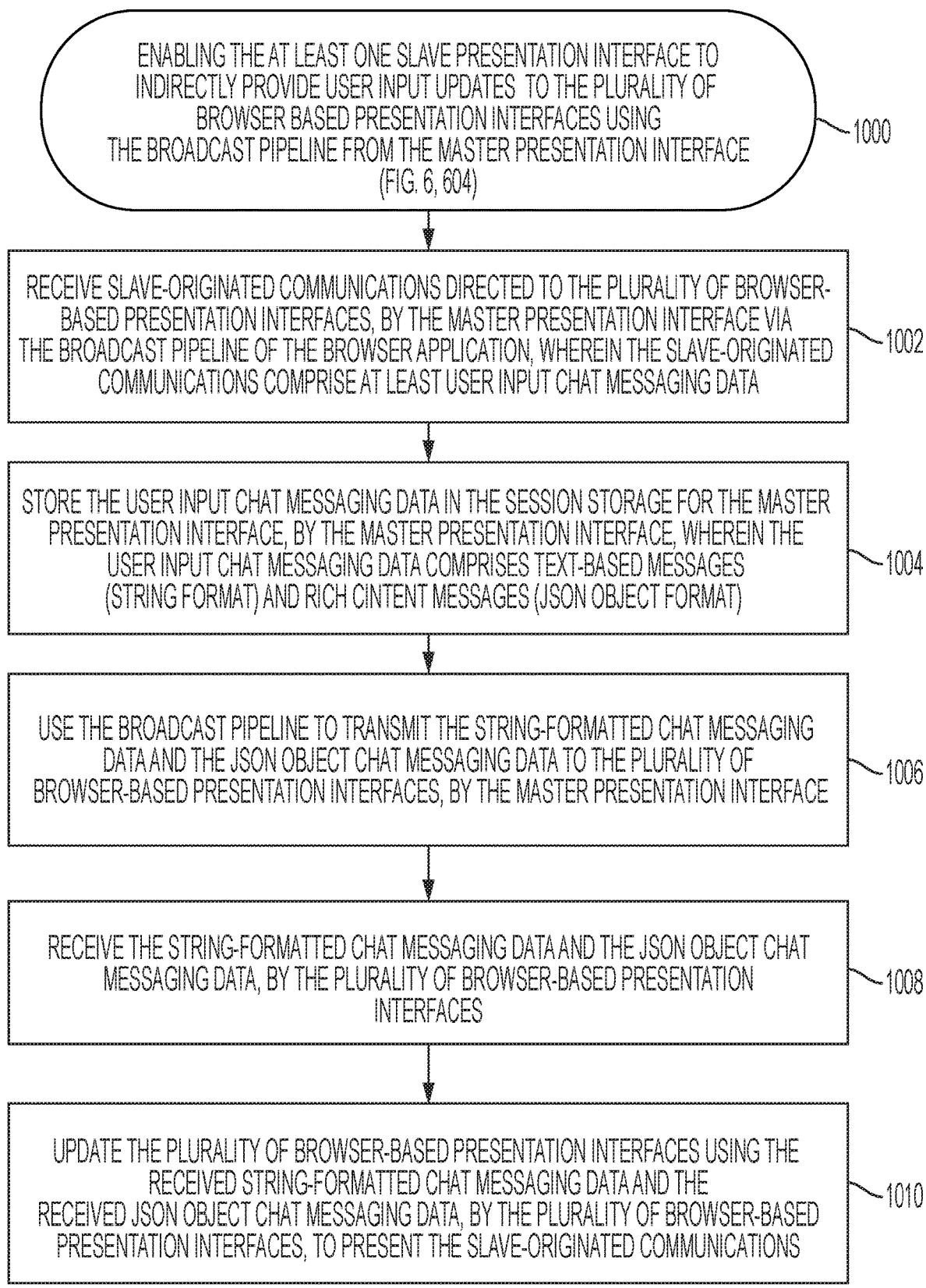
FIG. 10 is a flow chart that illustrates an embodiment of a process for enabling the at least one slave presentation interface to indirectly provide user input updates to the plurality of browser-based presentation interfaces using the broadcast pipeline from the master presentation interface, in accordance with the disclosed embodiments.

In the example described with regard to FIG. 10, the broadcasting presentation interface is a slave presentation interface that has already received an update comprising a user input data transmission and the listening presentation interface is the master presentation interface. Thus, the process 800 receives a user input data update for the browser application via a slave tab/window, and then the slave tab/window communicates the data update to the master tab/window via the broadcast pipeline to which the master is listening for the data update. The master presentation interface is then able to transmit the update to the server system (see reference 106 of FIG. 1) via the active connection between the master presentation interface and the server system.

FIG. 9 is a flow chart that illustrates a second embodiment of a process 900 for enabling the at least one slave presentation interface to indirectly communicate with the server system using the single communication session maintained by the master presentation interface, in accordance with the disclosed embodiments. It should be appreciated that the process 900 described in FIG. 9 represents one embodiment of step 602 described above in the discussion of FIG. 6, including additional detail.

The process 900 first receives slave-originated communications from the at least one slave presentation interface and directed to the server system, by the master presentation interface via the broadcast pipeline of the browser application, wherein the slave-originated communications comprise at least user input chat messaging data (step 902). When a user participates in a chat messaging session via a chat messaging interface provided by a browser tab/window (i.e., a presentation interface) of the browser application, the user provides user input chat messages to one of the slave browser tabs/windows. The user input chat messages are the slave-originated communications, which must be provided to the server system to complete transmission of the chat message to the other chat participant (e.g., a chat-bot, a live agent user of a computer system). Here, the master presentation interface receives the slave-originated, user input chat messages that have been transmitted by the slave presentation interface to the master presentation interface via the broadcast pipeline. Data transmission via the broadcast pipeline is described previously with regard to FIG. 8.

The process 900 then stores the user input chat messaging data in the session storage for the master presentation interface, by the master presentation interface, wherein the user input chat messaging data comprises text-based messages and rich content messages (step 904). The process 900 stores user input, text-based chat messages as plain text in a string format, in session storage for the master. The process 900 stores user input, rich content chat messages as JSON objects in session storage for the master. The process 900 stores the user input chat messaging data in the session storage for future transmission and display. For example, the user input chat messages are transmitted to the server system, using the single communication session between the master presentation interface and the server system (step 906). The process 900 can also transmit the user input chat messages, from the master to the plurality of slaves for purpose of updating the slaves.

FIG. 10 is a flow chart that illustrates an embodiment of a process 1000 for enabling the at least one slave presentation interface to indirectly provide user input updates to the plurality of browser-based presentation interfaces using the broadcast pipeline from the master presentation interface, in accordance with the disclosed embodiments. The process 1000 receives slave-originated communications directed to the plurality of browser-based presentation interfaces, by the master presentation interface via the broadcast pipeline of the browser application, wherein the slave-originated communications comprise at least user input chat messaging data (step 1002). When a user participates in a chat messaging session via a chat messaging interface provided by a browser tab/window (i.e., a presentation interface) of the browser application, the user provides user input chat messages to one of the slave browser tabs/windows. The user input chat messages are the slave-originated communications, which must be provided to the master presentation interface and the rest of the slave presentation interfaces in order to update the chat messaging interfaces corresponding to each of the open browser tabs/windows for the browser application. Here, the master presentation interface receives the slave-originated, user input chat messages that have been transmitted by the slave presentation interface to the master presentation interface via the broadcast pipeline. The master then provides the user input chat messages to the remaining slave presentation interfaces using the broadcast pipeline also. Data transmission via the broadcast pipeline is described previously with regard to FIG. 8.

The process 1000 stores the user input chat messaging data in the session storage for the master presentation interface, wherein the user input chat messaging data comprises text-based chat messages and rich content chat messages (step 1004). The process 1000 stores user input, text-based chat messages as plain text in a string format, in session storage for the master. The process 1000 stores user input, rich content chat messages as JSON objects in session storage for the master. The process 1000 stores the user input chat messaging data in the session storage for future transmission and display. For example, the process 1000 can also transmit the user input chat messages, from the master to the plurality of slaves for purpose of updating the slaves.

The process 1000 then uses the broadcast pipeline to transmit the string-formatted chat messaging data and the JSON object chat messaging data to the plurality of browser-based presentation interfaces, by the master presentation interface (step 1006). One suitable methodology for using the broadcast pipeline to transmit the string-formatted chat messaging data and the JSON object chat messaging data to the at least one slave presentation interface is described below with reference to FIG. 8.

The process 1000 receives the string-formatted chat messaging data and the JSON object chat messaging data, by the plurality of browser-based presentation interfaces (step 1008), and the process 1000 then updates the plurality of browser-based presentation interfaces using the received string-formatted chat messaging data and the received JSON object chat messaging data, by the plurality of browser-based presentation interfaces, to present the slave-originated communications (step 1010).

Figure 11:
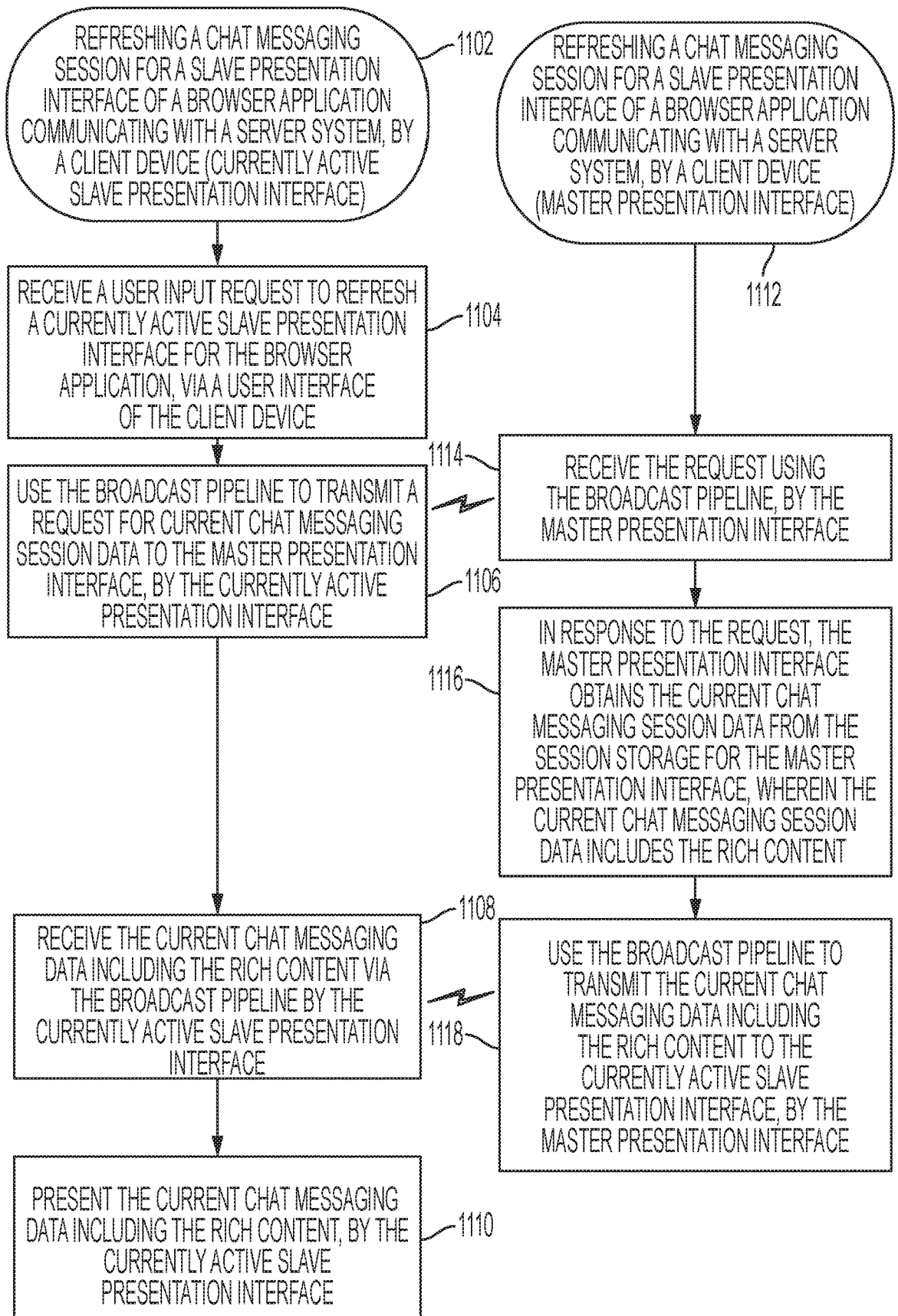
FIG. 11 is a flow chart that illustrates an embodiment of a process for refreshing a chat messaging session for a slave presentation interface of a browser application communicating with a server system, by a client device, in accordance with the disclosed embodiments.

FIG. 11 is a flow chart that illustrates an embodiment of a process 1100 for refreshing a chat messaging session for a slave presentation interface of a browser application communicating with a server system, by a client device, in accordance with the disclosed embodiments. As shown, the process 1100 includes steps performed by a currently active slave presentation interface 1102 and steps performed by a master presentation interface 1112, wherein the currently active slave presentation interface and the master presentation interface are included in the browser application.

The process 1100 receives a user input request to refresh a currently active slave presentation interface for the browser application, via a user interface of the client device (step 1104). The process 1100 then uses the broadcast pipeline to transmit a request for current chat messaging session data to the master presentation interface, by the currently active presentation interface (step 1106). Using the broadcast pipeline to transmit communications between open presentation interfaces of the browser application is described previously with regard to FIG. 8. The process 1100 receives the request using the broadcast pipeline by the master presentation interface (step 1114).

In response to the request to refresh the browser application, the master presentation interface obtains the current chat messaging session storage for the master presentation interface, wherein the current chat messaging session data includes the rich content (step 1116). The process 1100 then uses the broadcast pipeline to transmit the current chat messaging session data including the rich content to the currently active slave presentation interface, by the master presentation interface (step 1118). The process 1100 receives the current chat messaging data including the rich content via the broadcast pipeline, by the currently active slave presentation interface (step 1108). After receiving the current chat messaging data, the process 1100 then presents the current chat messaging data including the rich content, by the currently active slave presentation interface (step 1110).

Figure 12A:
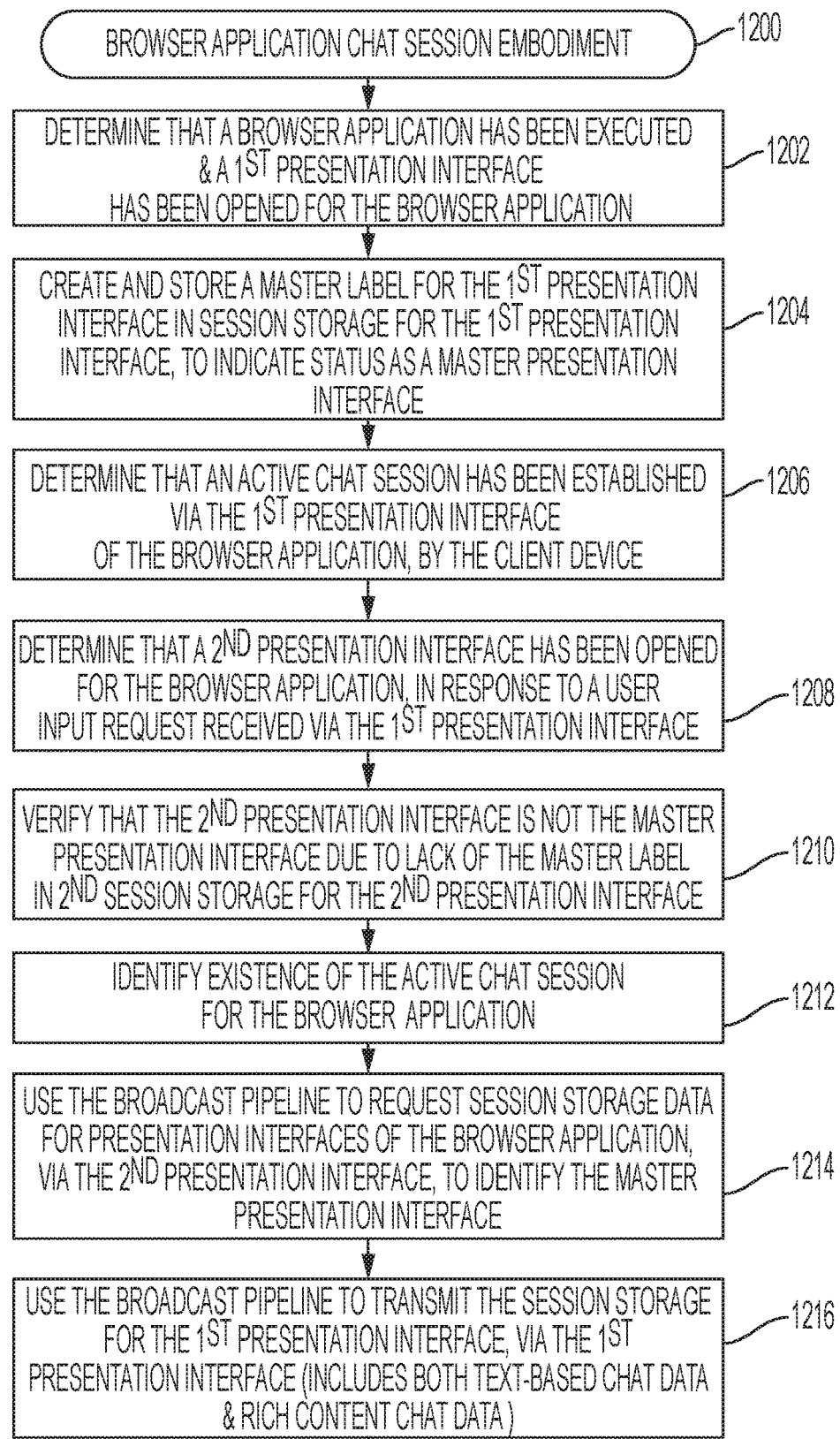
FIGS. 12A-12B are flow charts that illustrate an embodiment of a process for exchanging client device communications including rich content messaging data, with a server system, via a browser application configured to support a chat messaging session.
Figure 12B:
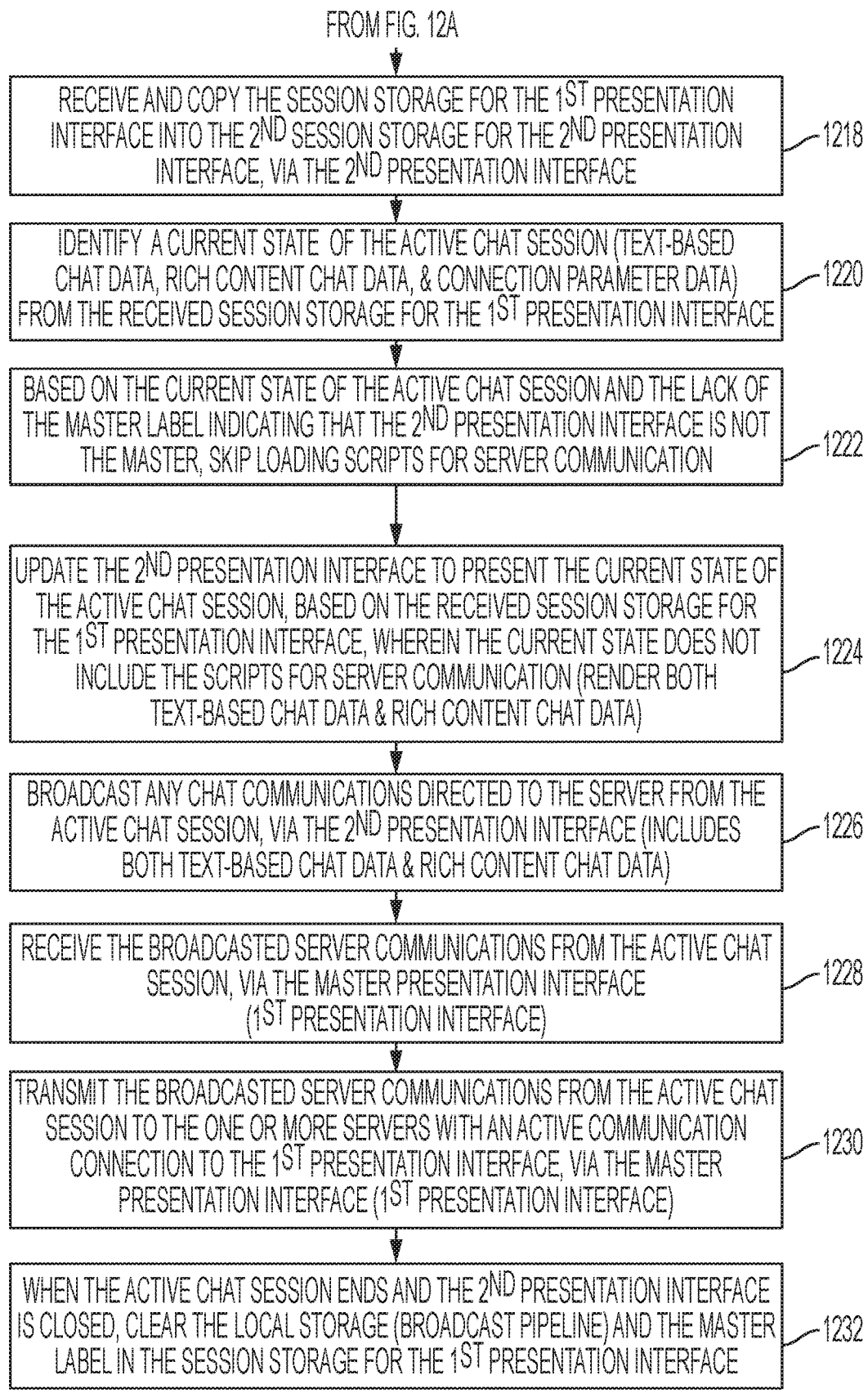

FIGS. 12A-12B are flow charts that illustrate an embodiment of a process 1200 for exchanging client device communications including rich content messaging data, with a server system, via a browser application configured to support a chat messaging session. The process 1200 is one particular embodiment of a chat messaging session implementation, wherein the presentation interfaces of the browser application are used by a client device user to participate in a chat session using a messaging widget, icon-based user interface, mini "app" (i.e., application), or other graphical element provided by presentation interfaces associated with the browser application.

First, the process 1200 determines that the browser application has been executed and a first presentation interface has been opened for the browser application (step 1202). As described herein a presentation interface is a browser tab or browser window, and during typical operation, the process 1200 detects that a user has initiated execution of the browser application via a user interface of the client device and, in response, the client device has executed the browser application and opens and displays the first presentation interface for the browser application. The first presentation interface provides a corresponding first chat messaging interface, used to present chat messaging data for a particular chat messaging session, or in other words, for a particular chat conversation between the user of the client device and another chat participant.

The process 1200 then creates and stores a master label for the first presentation interface in session storage for the first presentation interface, to indicate status as a master presentation interface (step 1204). The browser application provides one or more presentation interfaces for user viewing and interaction. A presentation interface is a graphical user interface (GUI) for user interaction with various websites and other web-based material (e.g., documents, panels, hyperlinks, graphical elements, text, images, data) presented by one or more remotely located servers via the internet and/or via an intranet. The browser application presents at least one presentation interface, but is also is generally configured to permit the user to open additional presentation interfaces (e.g., additional browser tabs and/or additional browser windows) during use. As described herein, the first presentation interface is designated as the "master" presentation interface which establishes an active communication session with the one or more remote servers, wherein the active communication session is associated with a particular identifier. Any additional presentation interfaces opened by the user via the client device, after and in addition to the first presentation interface, are referred to as "slave" presentation interfaces. As described herein, the slave presentation interfaces differ from the master presentation interface in that the slave presentation interfaces do not establish independent communication sessions with the one or more remote servers. Instead, the slave presentation interfaces communicate with the one or more remote servers via the active communication session associated with the master presentation interface. In this way, all presentation interfaces of the browser application communicate with the server using one single, individual browser-based communication session established on the client-side, thereby eliminating any need for multi-threading communications on the server-side.

The master label is stored in the session storage for the first presentation interface. Session storage is associated with one particular browser tab or browser window, and is accessible only to the one particular browser tab or browser window. Here, the process 1200 creates a distinction for the master presentation interface, such that the master can be distinguished from any of the set of slave presentation interfaces associated with the browser application. The master label may be any indication that the first presentation interface is the master presentation interface for the browser application, including a tag, notation, label, flag, variable setting, and/or any other indication which may be stored and maintained in the session storage of the first presentation interface.

Next, the process 1200 determines that an active chat session has been established via the first presentation interface of the browser application, by the client device (step 1206). The active chat session may be any messaging-based application or website functionality displayed and provided by the first presentation interface. In this scenario, the active chat session is associated with a particular website currently being accessed by the client device via the first presentation interface.

The process 1200 then determines that a second presentation interface has been opened for the browser application, in response to a user input request received via the first presentation interface (step 1208). Here, the process 1200 detects that the user has opened another browser tab or browser window, in addition to the currently-open first browser tab or first browser window (i.e., the first presentation interface).

The process 1200 verifies that the second presentation interface is not the master presentation interface due to lack of the master label in second session storage for the second presentation interface (step 1210). The process 1200 evaluates the data stored in session storage for the second presentation interface, and determines whether a master label is included in the session storage. However, there is one and only one master presentation interface at a time for the browser application. In this scenario, the master label is stored in the session storage for the first presentation interface, indicating that the master presentation interface is the first presentation interface. Here, the process 1200 determines that the session storage for the second presentation interface does not include the master label.

The process 1200 also identifies existence of the active chat session for the browser application (step 1212). When a chat session or other type of messaging application is activated by the client device (generally in response to a user input request), the process 1200 stores an indicator of the active chat session in a local storage for the browser application. The local storage is accessible to all presentation interfaces of the browser application, and thus the active chat sessions indicator is accessible to the process 1200 via the second presentation interface.

Due to the existence of the active chat session, the process 1200 uses the broadcast pipeline to request session storage data for presentation interfaces of the browser application, via the second presentation interface, to identify the master presentation interface (step 1214). Here, the second presentation interface is a new browser tab or new browser window that has been opened by the client device in response to a user input command. The process 1200 is aware that the second presentation interface is not the master presentation interface, and thus, the second presentation interface must be a slave presentation interface that communicates with one or more servers using a master presentation interface as an intermediary. Here, the process 1200 requests session storage data from any other presentation interface of the browser application, via the second presentation interface, such that the second presentation interface can identify the master presentation interface.

The process 1200 uses the broadcast pipeline to transmit the session storage for the first presentation interface, via the first presentation interface (step 1216). In this example, the process 1200 identifies the first presentation interface as the master presentation interface by requesting and receiving the session storage for the first presentation interface, which includes the master label that indicates the status as the master presentation interface. Generally, requesting and receiving the session storage is performed using the broadcast pipeline, which is described previously with regard to FIGS. 7, 8, and 10. The process 1200 receives and copies the session storage for the first presentation interface into the second session storage for the second presentation interface, via the second presentation interface (step 1218).

The process 1200 also identifies a current state of the active chat session (e.g., serialized chat data and communication data) from the received session storage for the first presentation interface (step 1220). The session storage for the first presentation interface (i.e., the master presentation interface) includes a master label and a current state of the active chat session, wherein the current state of the active chat session includes: (1) stored chat messaging data and (2) communication connection data for the active communication session with the remote servers. The stored chat messaging data may include text-based chat messaging data and rich content chat messaging data. The text-based chat messaging data is stored in a string format, such that the text-based chat messages may be presented in a plain-text format when retrieved from the session storage. The rich content chat messaging data is stored in a JavaScript Object Notation (JSON) object format, such that the rich content chat messages may be presented in a rich content format that provides the enhanced formatting, visual effects, and/or user interaction functionality that was present and available in the original rich content chat messages prior to storage in, and retrieval from, the session storage of the master presentation interface.

Here, the process 1200 copies the session storage for the first presentation interface into the session storage for the second presentation interface, such that the second presentation interface and corresponding chat messaging interface may duplicate and present the same chat session that is currently being presented by the first presentation interface. In this way, both of the first presentation interface (and corresponding chat messaging interface) and the second presentation interface (and corresponding chat messaging interface) are capable of displaying the same chat window or messaging application, wherein both of the first presentation interface and the second presentation interface are dynamically updated in real-time.

Based on the current state of the active chat session and the lack of the master label (wherein the lack indicates that the second presentation interface is not the master) the process 1200 skips loading scripts for server communication (step 1222). Here, the process 1200 configures the chat window or messaging application such that data communication messages are not transmitted to the server system, by intentionally failing to load scripts that enable direct server communication from the slave presentation interface.

The process 1200 updates the second presentation interface to present the current state of the active chat session, based on the received session storage for the first presentation interface, wherein the current state does not include the scripts for server communication (step 1224). The current state of the active chat session is the same as the current state of the active chat session displayed by the chat messaging interface provided by the first presentation interface, and both of the first presentation interface and the second presentation interface are dynamically updated in real-time, such that both corresponding chat messaging interfaces present the same chat data at the same time.

The process 1200 broadcasts any data communications directed to the server system from the active chat session, via the second presentation interface (step 1226). The process 1200 receives the broadcasted server communications (i.e., communications directed to the server from the second presentation interface) from the active chat session, via the master presentation interface (step 1228). In this scenario, the first presentation interface is the master presentation interface, which is indicated by the existence of the master label in the session storage of the first presentation interface, as described previously with regard to step 1204. The process 1200 transmits the broadcasted server communications from the active chat session to the one or more servers with an active communication connection to the first presentation interface, via the master presentation interface (step 1230). As described previously, in this scenario the first presentation interface is the master presentation interface, which is indicated by the existence of the master label in the session storage of the first presentation interface. During the active chat session, the process 1200 receives data communications from the server system via the master presentation interface that has an active communication session with the one or more servers, and the process 1200 provides the received data communications originating from the server system to the slave presentation interface that is active and in current use for the chat application. The received communications are provided by the master presentation interface using the broadcast pipeline. Further, during the active chat session, the process 1200 transmits data communications from the active chat session to the server system by broadcasting the data communications to the master presentation interface, and the master presentation interface proceeds to transmit the data communications from the active chat session to the server system.

When the active chat session ends and the second presentation interface is closed, the process 1200 clears the local storage (which is used to exchange communications between presentation interfaces of the browser application via the broadcast pipeline) and clears the master label in the session storage for the first presentation interface (step 1232).

The various tasks performed in connection with processes 500-1200 may be performed by software, hardware, firmware, or any combination thereof. For illustrative purposes, the preceding descriptions of processes 500-1200 may refer to elements mentioned above in connection with FIGS. 1-4. In practice, portions of processes 500-1200 may be performed by different elements of the described system. It should be appreciated that processes 500-1200 may include any number of additional or alternative tasks, the tasks shown in FIGS. 5-12 need not be performed in the illustrated order, and processes 500-1200 may be incorporated into a more comprehensive procedure or process having additional functionality not described in detail herein. Moreover, one or more of the tasks shown in FIGS. 5-12 could be omitted from embodiments of processes 500-1200 as long as the intended overall functionality remains intact.

Figure 13:
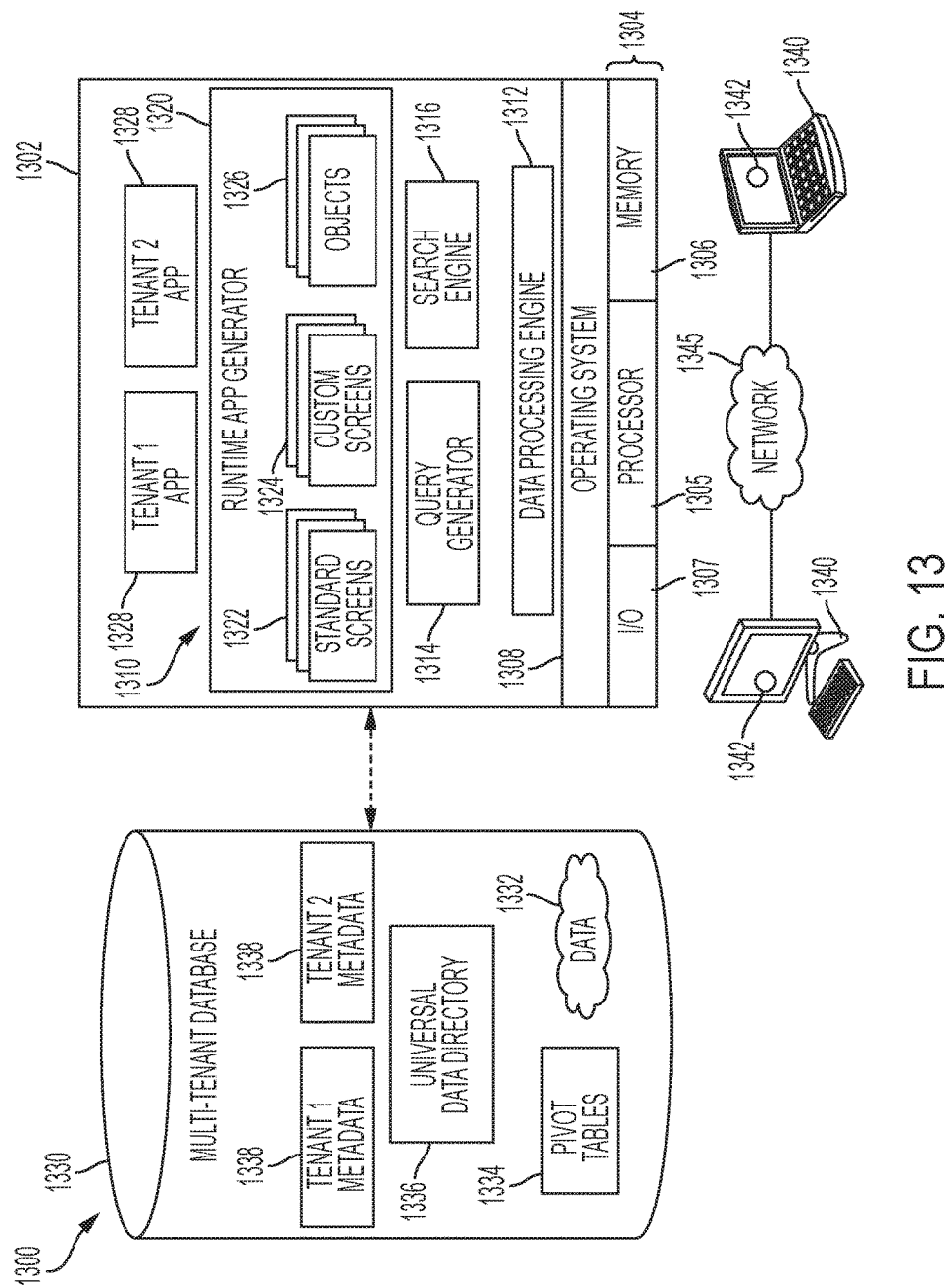
FIG. 13 is a block diagram of an exemplary multi-tenant database system suitable for use with the system of FIG. 1, in accordance with the disclosed embodiments.

FIG. 13 is a block diagram of an exemplary multi-tenant database system 1300 suitable for use with the system 100 of FIG. 1, in accordance with the disclosed embodiments. The illustrated multi-tenant database system 1300 of FIG. 13 includes a server 1302 (e.g., server system 106) that dynamically creates and supports virtual applications 1328 based upon data 1332 from a common database 1330 that is shared between multiple tenants, alternatively referred to herein as a multi-tenant database. Data and services generated by the virtual applications 1328 are provided via a network 1345 (e.g., data communication network 108) to any number of client devices 1340 (e.g., client device 102, or the like), as desired. Each virtual application 1328 is suitably generated at run-time (or on-demand) using a common application platform 1310 that securely provides access to the data 1332 in the database 1330 for each of the various tenants subscribing to the multi-tenant system 1300. In accordance with one non-limiting example, the multi-tenant system 1300 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 1330. In this regard, each tenant includes one or more users associated with, assigned to, or otherwise belonging to that respective tenant. To put it another way, each respective user within the multi-tenant system 1300 is associated with, assigned to, or otherwise belongs to a particular tenant of the plurality of tenants supported by the multi-tenant system 1300. Tenants may represent customers, customer departments, business or legal organizations, and/or any other entities that maintain data for particular sets of users within the multi-tenant system 1300 (i.e., in the multi-tenant database 1330). For example, the application server 1302 may be associated with one or more tenants supported by the multi-tenant system 1300. Although multiple tenants may share access to the server 1302 and the database 1330, the particular data and services provided from the server 1302 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 1332 belonging to or otherwise associated with other tenants.

The multi-tenant database 1330 is any sort of repository or other data storage system capable of storing and managing the data 1332 associated with any number of tenants. The database 1330 may be implemented using any type of conventional database server hardware. In various embodiments, the database 1330 shares processing hardware 1304 with the server 1302. In other embodiments, the database 1330 is implemented using separate physical and/or virtual database server hardware that communicates with the server 1302 to perform the various functions described herein. In an exemplary embodiment, the database 1330 includes a database management system or other equivalent software capable of determining an optimal query plan for retrieving and providing a particular subset of the data 1332 to an instance of virtual application 1328 in response to a query initiated or otherwise provided by a virtual application 1328. The multi-tenant database 1330 may alternatively be referred to herein as an on-demand database, in that the multi-tenant database 1330 provides (or is available to provide) data at run-time to on-demand virtual applications 1328 generated by the application platform 1310.

In practice, the data 1332 may be organized and formatted in any manner to support the application platform 1310. In various embodiments, the data 1332 is suitably organized into a relatively small number of large data tables to maintain a semi-amorphous "heap"-type format. The data 1332 can then be organized as needed for a particular virtual application 1328. In various embodiments, conventional data relationships are established using any number of pivot tables 1334 that establish indexing, uniqueness, relationships between entities, and/or other aspects of conventional database organization as desired. Further data manipulation and report formatting is generally performed at run-time using a variety of metadata constructs. Metadata within a universal data directory (UDD) 1336, for example, can be used to describe any number of forms, reports, workflows, user access privileges, business logic and other constructs that are common to multiple tenants. Tenant-specific formatting, functions and other constructs may be maintained as tenant-specific metadata 1338 for each tenant, as desired. Rather than forcing the data 1332 into an inflexible global structure that is common to all tenants and applications, the database 1330 is organized to be relatively amorphous, with the pivot tables 1334 and the metadata 1338 providing additional structure on an as-needed basis. To that end, the application platform 1310 suitably uses the pivot tables 1334 and/or the metadata 1338 to generate "virtual" components of the virtual applications 1328 to logically obtain, process, and present the relatively amorphous data 1332 from the database 1330.

The server 1302 is implemented using one or more actual and/or virtual computing systems that collectively provide the dynamic application platform 1310 for generating the virtual applications 1328. For example, the server 1302 may be implemented using a cluster of actual and/or virtual servers operating in conjunction with each other, typically in association with conventional network communications, cluster management, load balancing and other features as appropriate. The server 1302 operates with any sort of conventional processing hardware 1304, such as a processor 1305, memory 1306, input/output features 1307 and the like. The input/output features 1307 generally represent the interface(s) to networks (e.g., to the network 1345, or any other local area, wide area or other network), mass storage, display devices, data entry devices and/or the like. The processor 1305 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1306 represents any non-transitory short or long term storage or other computer-readable media capable of storing programming instructions for execution on the processor 1305, including any sort of random access memory (RAM), read only memory (ROM), flash memory, magnetic or optical mass storage, and/or the like. The computer-executable programming instructions, when read and executed by the server 1302 and/or processor 1305, cause the server 1302 and/or processor 1305 to create, generate, or otherwise facilitate the application platform 1310 and/or virtual applications 1328 and perform one or more additional tasks, operations, functions, and/or processes described herein. It should be noted that the memory 1306 represents one suitable implementation of such computer-readable media, and alternatively or additionally, the server 1302 could receive and cooperate with external computer-readable media that is realized as a portable or mobile component or application platform, e.g., a portable hard drive, a USB flash drive, an optical disc, or the like.

The application platform 1310 is any sort of software application or other data processing engine that generates the virtual applications 1328 that provide data and/or services to the client devices 1340. In a typical embodiment, the application platform 1310 gains access to processing resources, communications interfaces and other features of the processing hardware 1304 using any sort of conventional or proprietary operating system 1308. The virtual applications 1328 are typically generated at run-time in response to input received from the client devices 1340. For the illustrated embodiment, the application platform 1310 includes a bulk data processing engine 1312, a query generator 1314, a search engine 1316 that provides text indexing and other search functionality, and a runtime application generator 1320. Each of these features may be implemented as a separate process or other module, and many equivalent embodiments could include different and/or additional features, components or other modules as desired.

The runtime application generator 1320 dynamically builds and executes the virtual applications 1328 in response to specific requests received from the client devices 1340. The virtual applications 1328 are typically constructed in accordance with the tenant-specific metadata 1338, which describes the particular tables, reports, interfaces and/or other features of the particular application 1328. In various embodiments, each virtual application 1328 generates dynamic web content that can be served to a browser or other client program 1342 associated with its client device 1340, as appropriate.

The runtime application generator 1320 suitably interacts with the query generator 1314 to efficiently obtain multi-tenant data 1332 from the database 1330 as needed in response to input queries initiated or otherwise provided by users of the client devices 1340. In a typical embodiment, the query generator 1314 considers the identity of the user requesting a particular function (along with the user's associated tenant), and then builds and executes queries to the database 1330 using system-wide metadata 1336, tenant specific metadata 1338, pivot tables 1334, and/or any other available resources. The query generator 1314 in this example therefore maintains security of the common database 1330 by ensuring that queries are consistent with access privileges granted to the user and/or tenant that initiated the request. In this manner, the query generator 1314 suitably obtains requested subsets of data 1332 accessible to a user and/or tenant from the database 1330 as needed to populate the tables, reports or other features of the particular virtual application 1328 for that user and/or tenant.

Each database 1330 can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems 1300, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems 1300, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system 1300. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Still referring to FIG. 13, the data processing engine 1312 performs bulk processing operations on the data 1332 such as uploads or downloads, updates, online transaction processing, and/or the like. In many embodiments, less urgent bulk processing of the data 1332 can be scheduled to occur as processing resources become available, thereby giving priority to more urgent data processing by the query generator 1314, the search engine 1316, the virtual applications 1328, etc.

In exemplary embodiments, the application platform 1310 is utilized to create and/or generate data-driven virtual applications 1328 for the tenants that they support. Such virtual applications 1328 may make use of interface features such as custom (or tenant-specific) screens 1324, standard (or universal) screens 1322 or the like. Any number of custom and/or standard objects 1326 may also be available for integration into tenant-developed virtual applications 1328. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 1326 such as "account" objects, "opportunity" objects, "contact" objects, or the like. The data 1332 associated with each virtual application 1328 is provided to the database 1330, as appropriate, and stored until it is requested or is otherwise needed, along with the metadata 1338 that describes the particular features (e.g., reports, tables, functions, objects, fields, formulas, code, etc.) of that particular virtual application 1328. For example, a virtual application 1328 may include a number of objects 1326 accessible to a tenant, wherein for each object 1326 accessible to the tenant, information pertaining to its object type along with values for various fields associated with that respective object type are maintained as metadata 1338 in the database 1330. In this regard, the object type defines the structure (e.g., the formatting, functions and other constructs) of each respective object 1326 and the various fields associated therewith.

Still referring to FIG. 13, the data and services provided by the server 1302 can be retrieved using any sort of personal computer, mobile telephone, tablet or other network-enabled client device 1340 on the network 1345. In an exemplary embodiment, the client device 1340 includes a display device, such as a monitor, screen, or another conventional electronic display capable of graphically presenting data and/or information retrieved from the multi-tenant database 1330. Typically, the user operates a conventional browser application or other client program 1342 executed by the client device 1340 to contact the server 1302 via the network 1345 using a networking protocol, such as the hypertext transport protocol (HTTP) or the like. The user typically authenticates his or her identity to the server 1302 to obtain a session identifier ("SessionID") that identifies the user in subsequent communications with the server 1302. When the identified user requests access to a virtual application 1328, the runtime application generator 1320 suitably creates the application at run time based upon the metadata 1338, as appropriate. As noted above, the virtual application 1328 may contain Java, ActiveX, or other content that can be presented using conventional client software running on the client device 1340; other embodiments may simply provide dynamic web or other content that can be presented and viewed by the user, as desired.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The preceding description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for communicating during a chat messaging session, by a client device comprising a computer system configured to store, maintain, execute, and support a browser application that includes chat messaging functionality, the method comprising:
    presenting a plurality of browser-based presentation interfaces comprising at least one of browser-based tabs and browser-based windows, by the client device, wherein the plurality of browser-based presentation interfaces are associated with the browser application, and wherein the plurality of browser-based presentation interfaces include a master presentation interface and at least one slave presentation interface;
    presenting a chat messaging interface for the chat messaging session, by the client device via the master presentation interface, wherein the chat messaging interface is configured to display the chat messaging session including chat messaging data;
    establishing a single communication session with a server system providing the chat messaging session to the browser application, by the client device via the master presentation interface;
    receiving a subset of the chat messaging data, by the chat messaging interface of the master presentation interface via the single communication session, wherein the subset includes rich content comprising at least one of graphical elements, enhanced formatting, and interactive functionality;
    storing the subset of the chat messaging data including the rich content in session storage for the master presentation interface of the browser application, by the client device;
    rendering the subset of the chat messaging data including the rich content, via the chat messaging interface of the master presentation interface;
    providing updated chat messaging session data to the at least one slave presentation interface, by the master presentation interface via a broadcast pipeline for the browser application, wherein the updated chat messaging session data comprises the subset including the rich content; and
    presenting the updated chat messaging session data by re-rendering the subset including the rich content, via at least one secondary chat messaging interface corresponding to the at least one slave presentation interface.

2. The method of claim 1, further comprising:
    when the at least one slave presentation interface is opened, receiving a request for the session storage of the master presentation interface from the at least one slave presentation interface, by the master presentation interface; and
    in response to receiving the request, transmitting the session storage comprising the subset including the rich content via the broadcast pipeline, by the master presentation interface.

3. The method of claim 1, further comprising:
    after receiving the subset of the chat messaging data, storing the subset including the rich content as a JavaScript Object Notation (JSON) object in the session storage for the master presentation interface of the browser application;
    broadcasting the JSON object via the broadcast pipeline to the at least one slave presentation interface, by the master presentation interface, wherein the updated chat messaging session data comprise the JSON object.

4. The method of claim 1, further comprising:
receiving a user input request to refresh a currently active slave presentation interface of the browser application, via a user interface of the client device, wherein the at least one slave presentation interface comprises the currently active slave presentation interface; and
refreshing the currently active slave presentation interface, by:
using the broadcast pipeline to transmit a request for current chat messaging session data to the master presentation interface, by the client device via the currently active slave presentation interface;
receiving the request using the broadcast pipeline, via the master presentation interface; and
in response to the request,
obtaining the current chat messaging session data from the session storage for the master presentation interface, wherein the updated chat messaging session data comprises the current chat messaging session data, and wherein the current chat messaging session data includes the rich content;
using the broadcast pipeline to transmit the current chat messaging session data including the rich content to the currently active slave presentation interface, via the master presentation interface; and
presenting the current chat messaging session data including the rich content, by the currently active slave presentation interface.

5. The method of claim 1, further comprising:
dynamically updating the plurality of browser-based presentation interfaces, in real-time, by:
receiving the chat messaging data in real-time during the chat messaging session, from the server system via the single communication session, by the chat messaging interface of the master presentation interface;
rendering the chat messaging data via the chat messaging interface of the master presentation interface in real-time, wherein the chat messaging data comprises a plurality of chat messages that include the rich content, and wherein the plurality of chat messages comprises at least the subset;
storing the chat messaging data in the session storage for the master presentation interface, wherein the chat messaging data is stored in a format to preserve the rich content associated with corresponding ones of the plurality of chat messages, to create rich content format messaging data; and
providing the chat messaging data including the rich content format messaging data, from the session storage, to the at least one slave presentation interface in real-time during the chat messaging session, via the broadcast pipeline of the browser application, wherein the updated chat messaging session data comprises the chat messaging data including the rich content format messaging data.

6. The method of claim 1, further comprising:
dynamically updating the plurality of browser-based presentation interfaces, in real-time, by:
receiving user input chat messaging data in real-time during the chat messaging session, via a user interface of the client device, by a currently active chat messaging interface of a currently active slave presentation interface, wherein the chat messaging data comprises the user input chat messaging data, and wherein the at least one slave presentation interface comprises the currently active slave presentation interface;
rendering the chat messaging data via the currently active chat messaging interface of the currently active slave presentation interface, wherein the chat messaging data comprises a plurality of chat messages that include the rich content, and wherein the plurality of chat messages comprises at least the subset;
storing the chat messaging data in current slave session storage of the currently active slave presentation interface, wherein the chat messaging data is stored in a format to preserve the rich content associated with corresponding ones of the plurality of chat messages, to create rich content format messaging data;
using the broadcast pipeline to transmit the chat messaging data including the rich content format messaging data, from the current slave session storage, to the master presentation interface in real-time during the chat messaging session, by the currently active slave presentation interface;
receiving the chat messaging data including the rich content format messaging data, by the master presentation interface;
storing the chat messaging data including the rich content format messaging data in the session storage for the master presentation interface, by the client device; and
using the broadcast pipeline to transmit the chat messaging data including the rich content format messaging data to additional chat messaging interfaces of additional slave presentation interfaces of the browser application, in real-time and from the session storage of the master presentation interface, by the master presentation interface, wherein the updated chat messaging session data comprises the chat messaging data including the rich content format messaging data, wherein the at least one slave presentation interface comprises the additional slave presentation interfaces, and wherein the at least one secondary chat messaging interface comprises the additional chat messaging interfaces.

7. The method of claim 1, further comprising:
using the master presentation interface as a communications intermediary for the plurality of browser-based presentation interfaces of the browser application, by:
enabling the at least one slave presentation interface to indirectly communicate with the server system using the single communication session maintained by the master presentation interface; and
enabling the at least one slave presentation interface to indirectly provide user input updates to the plurality of browser-based presentation interfaces using the broadcast pipeline from the master presentation interface.

8. A client device configured to communicate with a server system during a chat messaging session, the client device configured to store, maintain, execute, and support a browser application that includes chat messaging functionality, the client device comprising:
a system memory element;

a communication device, configured to establish communication connections to the server system and to transmit and receive data via the communication connections;

a display device, configured to present a plurality of browser-based presentation interfaces comprising at least one of browser-based tabs and browser-based windows, wherein the plurality of browser-based presentation interfaces are associated with the browser application, and wherein the plurality of browser-based presentation interfaces include a master presentation interface and at least one slave presentation interface;

at least one processor communicatively coupled to the system memory element, the communication device, and the display device, the at least one processor configured to:

present a chat messaging interface for the chat messaging session, via the master presentation interface, wherein the chat messaging interface is configured to display the chat messaging session including chat messaging data;

initiate establishing a single communication session with the server system providing the chat messaging session to the browser application, by the communication device via the master presentation interface;

receive a subset of the chat messaging data, by the chat messaging interface of the master presentation interface via the single communication session, wherein the subset includes rich content comprising at least one of graphical elements, enhanced formatting, and interactive functionality;

store the subset of the chat messaging data including the rich content in session storage for the master presentation interface of the browser application;

initiate rendering the subset of the chat messaging data including the rich content, by the display device via the chat messaging interface of the master presentation interface;

provide updated chat messaging session data to the at least one slave presentation interface, by the master presentation interface via a broadcast pipeline for the browser application, wherein the updated chat messaging session data comprises the subset including the rich content; and initiate presenting the updated chat messaging session data by re-rendering the subset including the rich content, by the display device via at least one secondary chat messaging interface corresponding to the at least one slave presentation interface.

9. The client device of claim 8, wherein the at least one processor is further configured to:

when the at least one slave presentation interface is opened, receive a request for the session storage of the master presentation interface from the at least one slave presentation interface, by the master presentation interface; and in response to receiving the request, transmit the session storage comprising the subset including the rich content via the broadcast pipeline, via the master presentation interface.

10. The client device of claim 8, wherein the at least one processor is further configured to:

after receiving the subset of the chat messaging data, store the subset including the rich content as a JavaScript Object Notation (JSON) object in the session storage for the master presentation interface of the browser application; and broadcast the JSON object via the broadcast pipeline to the at least one slave presentation interface, via the master presentation interface, wherein the updated chat messaging session data comprise the JSON object.

11. The client device of claim 8, further comprising a user interface of the client device, wherein the user interface is communicatively coupled to the at least one processor;

wherein the at least one processor is further configured to:

receive a user input request to refresh a currently active slave presentation interface of the browser application, via the user interface, wherein the at least one slave presentation interface comprises the currently active slave presentation interface; and refresh the currently active slave presentation interface, by:

using the broadcast pipeline to transmit a request for current chat messaging session data to the master presentation interface, via the currently active slave presentation interface;

receiving the request using the broadcast pipeline, via the master presentation interface; and in response to the request, obtaining the current chat messaging session data from the session storage for the master presentation interface, wherein the updated chat messaging session data comprises the current chat messaging session data, and wherein the current chat messaging session data includes the rich content;

using the broadcast pipeline to transmit the current chat messaging session data including the rich content to the currently active slave presentation interface, via the master presentation interface; and presenting the current chat messaging session data including the rich content, by the currently active slave presentation interface.

12. The client device of claim 8, wherein the at least one processor is further configured to:

dynamically update the plurality of browser-based presentation interfaces, in real-time, by:

receiving the chat messaging data in real-time during the chat messaging session, from the server system via the single communication session, by the chat messaging interface of the master presentation interface;

rendering the chat messaging data via the chat messaging interface of the master presentation interface in real-time, wherein the chat messaging data comprises a plurality of chat messages that include the rich content, and wherein the plurality of chat messages comprises at least the subset;

storing the chat messaging data in the session storage for the master presentation interface, wherein the chat messaging data is stored in a format to preserve the rich content associated with corresponding ones of the plurality of chat messages, to create rich content format messaging data; and providing the chat messaging data including the rich content format messaging data, from the session storage, to the at least one slave presentation interface in real-time during the chat messaging session, via the broadcast pipeline of the browser application, wherein the updated chat messaging session data comprises the chat messaging data including the rich content format messaging data.

13. The client device of claim 8, further comprising a user interface of the client device, wherein the user interface is communicatively coupled to the at least one processor;

wherein the at least one processor is further configured to:
dynamically update the plurality of browser-based presentation interfaces, in real-time, by:
receiving user input chat messaging data in real-time during the chat messaging session, via the user interface, by a currently active chat messaging interface of a currently active slave presentation interface, wherein the chat messaging data comprises the at least user input chat messaging data, and wherein the at least one slave presentation interface comprises the currently active slave presentation interface;
rendering the chat messaging data via the currently active chat messaging interface of the currently active slave presentation interface, wherein the chat messaging data comprises a plurality of chat messages that include the rich content, and wherein the plurality of chat messages comprises at least the subset;
storing the chat messaging data in current slave session storage of the currently active slave presentation interface, wherein the chat messaging data is stored in a format to preserve the rich content associated with corresponding ones of the plurality of chat messages, to create rich content format messaging data;
using the broadcast pipeline to transmit the chat messaging data including the rich content format messaging data, from the current slave session storage, to the master presentation interface in real-time during the chat messaging session, by the currently active slave presentation interface;
receiving the chat messaging data including the rich content format messaging data, by the master presentation interface;
storing the chat messaging data including the rich content format messaging data in the session storage for the master presentation interface; and
using the broadcast pipeline to transmit the chat messaging data including the rich content format messaging data to additional chat messaging interfaces of additional slave presentation interfaces of the browser application, in real-time and from the session storage of the master presentation interface, by the master presentation interface, wherein the updated chat messaging session data comprises the chat messaging data including the rich content format messaging data, wherein the at least one slave presentation interface comprises the additional slave presentation interfaces, and wherein the at least one secondary chat messaging interface comprises the additional chat messaging interfaces.

14. The client device of claim 8, wherein the at least one processor is further configured to:
use the master presentation interface as a communications intermediary for the plurality of browser-based presentation interfaces of the browser application, by:
enabling the at least one slave presentation interface to indirectly communicate with the server system using the single communication session maintained by the master presentation interface, via the communication device; and
enabling the at least one slave presentation interface to indirectly provide user input updates to the plurality of browser-based presentation interfaces using the broadcast pipeline from the master presentation interface.

15. A non-transitory, computer-readable medium containing instructions thereon, which, when executed by a processor, are capable of performing a method for communicating during a chat messaging session, by a client device comprising a computer system configured to store, maintain, execute, and support a browser application that includes chat messaging functionality, the method comprising:
presenting a plurality of browser-based presentation interfaces comprising at least one of browser-based tabs and browser-based windows, by the client device, wherein the plurality of browser-based presentation interfaces are associated with the browser application, and wherein the plurality of browser-based presentation interfaces include a master presentation interface and at least one slave presentation interface;
presenting a chat messaging interface for the chat messaging session, by the client device via the master presentation interface, wherein the chat messaging interface is configured to display the chat messaging session including chat messaging data;
establishing a single communication session with a server system providing the chat messaging session to the browser application, by the client device via the master presentation interface;
using the master presentation interface as a communications intermediary for the plurality of browser-based presentation interfaces of the browser application, by enabling the at least one slave presentation interface to indirectly communicate with the server system using the single communication session maintained by the master presentation interface, by:
receiving a subset of the chat messaging data, by the chat messaging interface of the master presentation interface via the single communication session, wherein the subset includes rich content comprising at least one of graphical elements, enhanced formatting, and interactive functionality;
storing the subset of the chat messaging data including the rich content in session storage for the master presentation interface of the browser application, by the client device;
rendering the subset of the chat messaging data including the rich content, via the chat messaging interface of the master presentation interface;
providing updated chat messaging session data to the at least one slave presentation interface, by the master presentation interface via a broadcast pipeline for the browser application, wherein the updated chat messaging session data comprises the subset including the rich content; and
presenting the updated chat messaging session data by re-rendering the subset including the rich content, via at least one secondary chat messaging interface corresponding to the at least one slave presentation interface.

16. The non-transitory, computer-readable medium of claim 15, wherein enabling the at least one slave presentation interface to indirectly communicate with the server system, further comprises:
receiving server-originated communications directed to the at least one slave presentation interface, by the master presentation interface via the single communication session, wherein the server-originated communications comprise at least the chat messaging data;

storing the chat messaging data in the session storage for the master presentation interface, by the master presentation interface, wherein the chat messaging data comprises text messages and rich content messages, wherein the text messages are stored in a string format in the session storage to generate string-formatted chat messaging data, and wherein the rich content messages are stored in a JavaScript Object Notation (JSON) object format in the session storage to generate JSON object chat messaging data;

using the broadcast pipeline to transmit the string-formatted chat messaging data and the JSON object chat messaging data to the at least one slave presentation interface, by the master presentation interface;

receiving the string-formatted chat messaging data and the JSON object chat messaging data, by the at least one slave presentation interface; and updating the at least one slave presentation interface using the received string-formatted chat messaging data and the received JSON object chat messaging data, by the at least one slave presentation interface.

17. The non-transitory, computer-readable medium of claim 16, wherein using the broadcast pipeline to transmit the string-formatted chat messaging data and the JSON object chat messaging data to the at least one slave presentation interface, further comprises:

writing the chat messaging data including the string-formatted chat messaging data and the JSON object chat messaging data to local storage of the browser application, by the master presentation interface, wherein the local storage is accessible to the plurality of browser-based presentation interfaces;

broadcasting a storage change event to the plurality of browser-based presentation interfaces to generate a storage change broadcast, via the local storage by the client device, wherein the storage change event includes the chat messaging data, and wherein the broadcast pipeline includes broadcasting the storage change event;

listening for the storage change broadcast via the at least one slave presentation interface, by the client device; and updating the at least one slave presentation interface, based on the storage change broadcast, via the at least one slave presentation interface by the client device.

18. The non-transitory, computer-readable medium of claim 15, wherein enabling the at least one slave presentation interface to indirectly communicate with the server system, further comprises:

receiving slave-originated communications from the at least one slave presentation interface and directed to the server system, by the master presentation interface via the broadcast pipeline of the browser application, wherein the slave-originated communications comprise at least user input chat messaging data;

storing the at least user input chat messaging data in the session storage for the master presentation interface, by the master presentation interface, wherein the at least user input chat messaging data comprises text messages and rich content messages, wherein the text messages are stored in a string format in the session storage to generate string-formatted chat messaging data, and wherein the rich content messages are stored in a JavaScript Object Notation (JSON) object format in the session storage to generate JSON object chat messaging data; and using the single communication session with the server system to transmit the string-formatted chat messaging data and the JSON object chat messaging data to the server system, by the master presentation interface.

19. The non-transitory, computer-readable medium of claim 15, wherein the method further comprises:

enabling the at least one slave presentation interface to indirectly provide user input updates to the plurality of browser-based presentation interfaces, by:

receiving slave-originated communications from the at least one slave presentation interface and directed to the plurality of browser-based presentation interfaces, by the master presentation interface via the broadcast pipeline of the browser application, wherein the slave-originated communications comprise at least user input chat messaging data;

storing the at least user input chat messaging data in the session storage for the master presentation interface, by the master presentation interface, wherein the chat messaging data comprises text messages and rich content messages, wherein the text messages are stored in a string format in the session storage to generate string-formatted chat messaging data, and wherein the rich content messages are stored in a JavaScript Object Notation (JSON) object format in the session storage to generate JSON object chat messaging data;

using the broadcast pipeline to transmit the string-formatted chat messaging data and the JSON object chat messaging data to the plurality of browser-based presentation interfaces, by the master presentation interface;

receiving the string-formatted chat messaging data and the JSON object chat messaging data, by the plurality of browser-based presentation interfaces; and updating the plurality of browser-based presentation interfaces using the received string-formatted chat messaging data and the received JSON object chat messaging data, by the plurality of browser-based presentation interfaces.

20. The non-transitory, computer-readable medium of claim 19, wherein the method further comprises:

using the broadcast pipeline to transmit the string-formatted chat messaging data and the JSON object chat messaging data to the plurality of browser-based presentation interfaces, by:

writing the at least user input chat messaging data including the string-formatted chat messaging data and the JSON object chat messaging data to local storage of the browser application, by the master presentation interface, wherein the local storage is accessible to the plurality of browser-based presentation interfaces;

broadcasting a storage change event to the plurality of browser-based presentation interfaces to generate a storage change broadcast, via the local storage by the client device, wherein the storage change event includes the at least user input chat messaging data, and wherein the broadcast pipeline includes broadcasting the storage change event;

listening for the storage change broadcast via the plurality of browser-based presentation interfaces, by the client device; and updating the plurality of browser-based presentation interfaces, based on the storage change broadcast, via the plurality of browser-based presentation interfaces by the client device.

\* \* \* \* \*